US011082096B2

(12) United States Patent
Akkarakaran et al.

(10) Patent No.: US 11,082,096 B2
(45) Date of Patent: *Aug. 3, 2021

(54) FEEDBACK TECHNIQUES IN WIRELESS COMMUNICATIONS

(71) Applicant: QUALCOMM INCORPORATED, San Diego, CA (US)

(72) Inventors: Sony Akkarakaran, Poway, CA (US); Tao Luo, San Diego, CA (US); Makesh Pravin John Wilson, San Diego, CA (US); Kaushik Chakraborty, San Diego, CA (US); Wooseok Nam, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,969

(22) Filed: Dec. 27, 2019

(65) Prior Publication Data

US 2020/0259532 A1 Aug. 13, 2020

Related U.S. Application Data

(63) Continuation of application No. 15/951,901, filed on Apr. 12, 2018, now Pat. No. 10,574,309.

(Continued)

(51) Int. Cl.
*H04B 7/0417* (2017.01)
*H04L 1/16* (2006.01)
(Continued)

(52) U.S. Cl.
CPC ........... *H04B 7/0421* (2013.01); *H04B 7/063* (2013.01); *H04B 7/0626* (2013.01);
(Continued)

(58) Field of Classification Search
None
See application file for complete search history.

(56) References Cited

U.S. PATENT DOCUMENTS 9,781,711 B2 * 10/2017 Kim ........................ H04L 5/001
9,838,972 B2 * 12/2017 Wang .................... H04W 52/28
(Continued)

FOREIGN PATENT DOCUMENTS

WO WO-2016056981 A1 4/2016
WO WO-2016080734 A1 5/2016
(Continued)

OTHER PUBLICATIONS

International Search Report and Written Opinion—PCT/US2018/027472—ISA/EPO—dated Jul. 13, 2018.

*Primary Examiner* — Adolf Dsouza
(74) *Attorney, Agent, or Firm* — Holland & Hart LLP/Qualcomm

(57) ABSTRACT

A user equipment (UE) may be configured to communicate a number of transmissions that may each have separate feedback processes. A feedback configuration for providing feedback for such separate feedback processes may be determined based on semi-static signaling and dynamic signaling. In some cases, semi-static signaling, such as radio resource control (RRC) signaling and dynamic signaling, such as downlink control information (DCI), may together provide a feedback configuration for a particular transmission. The semi-static signaling may provide a number of bits of feedback information, an interpretation of the bits of feedback information, or combinations thereof, and dynamic signaling may indicate that one or more of the bits are to have one of a number of available interpretations, may indicate that one or more additional bits are to be included with feedback, of combinations thereof. These feedback (Continued)

techniques may be used to provide feedback for uplink or downlink transmissions.

30 Claims, 16 Drawing Sheets

Related U.S. Application Data

(60) Provisional application No. 62/485,887, filed on Apr. 14, 2017.

(51) Int. Cl.
*H04L 1/18* (2006.01)
*H04B 7/06* (2006.01)
*H04L 5/00* (2006.01)

(52) U.S. Cl.
CPC ......... *H04B 7/0632* (2013.01); *H04B 7/0645* (2013.01); *H04L 1/1671* (2013.01); *H04L 1/1685* (2013.01); *H04L 1/1822* (2013.01); *H04L 1/1864* (2013.01); *H04L 5/001* (2013.01); *H04L 5/0055* (2013.01)

(56) References Cited

U.S. PATENT DOCUMENTS

| | | | |
|---|---|---|---|
| 2010/0034303 A1* | 2/2010 | Damnjanovic | H04L 5/0091 375/260 |
| 2013/0250924 A1 | 9/2013 | Chen et al. | |
| 2016/0233999 A1 | 8/2016 | Chendamarai et al. | |
| 2016/0338041 A1* | 11/2016 | Li | H04L 5/0055 |
| 2017/0331595 A1 | 11/2017 | Rudolf et al. | |
| 2018/0302128 A1 | 10/2018 | Akkarakaran et al. | |

FOREIGN PATENT DOCUMENTS

| | | |
|---|---|---|
| WO | WO-2016123372 A1 | 8/2016 |
| WO | WO-2017078782 A1 | 5/2017 |

* cited by examiner

FEEDBACK TECHNIQUES IN WIRELESS COMMUNICATIONS

CROSS REFERENCES

The present Application for Patent is a Continuation of U.S. patent application Ser. No. 15/951,901 by Akkarakaran, et al., entitled, "Feedback Techniques in Wireless Communications", filed Apr. 12, 2018, which claims priority to U.S. Provisional Patent Application No. 62/485,887 by Akkarakaran, et al., entitled "Feedback Techniques in Wireless Communications," filed Apr. 14, 2017, assigned to the assignee hereof.

BACKGROUND

The following relates generally to wireless communication, and more specifically to feedback techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Base stations and UEs in some LTE or NR deployments may utilize feedback techniques to enhance the reliability of communications, in which a receiving device (e.g., a UE receiving a downlink transmission or a base station receiving an uplink transmission) may transmit an acknowledgment or negative acknowledgment (ACK/NACK) to indicate whether a transmission was successfully or unsuccessfully received. In the event that a transmission is unsuccessfully received, the transmitter may perform a retransmission. In some examples, such feedback may be provided according to hybrid acknowledgment repeat request (HARQ) feedback techniques in which a number of HARQ processes may be configured for different transmissions.

SUMMARY

The described techniques relate to improved methods, systems, devices, or apparatuses that support feedback techniques in wireless communications. In a wireless communications system, such as a NR or 5G system, a UE may be configured to communicate using a number of different services, a number of different types of information, or combinations thereof, that may each have separate feedback processes. A feedback configuration for providing feedback for such separate feedback processes may be determined based on semi-static signaling and dynamic signaling. In some cases, semi-static signaling such as radio resource control (RRC) signaling, and dynamic signaling, such as downlink control information (DCI), may together provide a feedback configuration for a particular transmission. The semi-static signaling may provide a number of bits of feedback information, an interpretation of the bits of feedback information, or combinations thereof, and dynamic signaling may indicate that one or more of the bits are to have one of a number of available interpretations, may indicate that one or more additional bits are to be included with feedback, of combinations thereof. Feedback techniques as discussed herein may be used to provide feedback for uplink or downlink transmissions.

A method of wireless communication is described. The method may include identifying a feedback configuration for providing feedback of successful reception of one or more downlink transmissions to a user equipment (UE), the feedback configuration based at least in part on a plurality of types of information configured for transmission to the UE that have separate feedback processes, transmitting semi-static signaling to the UE that indicates the feedback configuration to be applied across a plurality of transmissions, transmitting dynamic signaling associated with at least a first transmission of the plurality of transmissions, the dynamic signaling indicating how the feedback configuration is to be applied to the first transmission, receiving feedback information from the UE according to the feedback configuration, and determining one or more of a number of bits or an interpretation of each bit of the feedback information based at least in part on the semi-static signaling and the dynamic signaling associated with the first transmission.

An apparatus for wireless communication is described. The apparatus may include means for identifying a feedback configuration for providing feedback of successful reception of one or more downlink transmissions to a UE, the feedback configuration based at least in part on a plurality of types of information configured for transmission to the UE that have separate feedback processes, means for transmitting semi-static signaling to the UE that indicates the feedback configuration to be applied across a plurality of transmissions, means for transmitting dynamic signaling associated with at least a first transmission of the plurality of transmissions, the dynamic signaling indicating how the feedback configuration is to be applied to the first transmission, means for receiving feedback information from the UE according to the feedback configuration, and means for determining one or more of a number of bits or an interpretation of each bit of the feedback information based at least in part on the semi-static signaling and the dynamic signaling associated with the first transmission.

Another apparatus for wireless communication is described. The apparatus may include a processor, memory in electronic communication with the processor, and instructions stored in the memory. The instructions may be operable to cause the processor to identify a feedback configuration for providing feedback of successful reception of one or more downlink transmissions to a UE, the feedback configuration based at least in part on a plurality of types of information configured for transmission to the UE that have separate feedback processes, transmit semi-static signaling to the UE that indicates the feedback configuration to be applied across a plurality of transmissions, transmit dynamic signaling associated with at least a first transmission of the plurality of transmissions, the dynamic signaling indicating how the feedback configuration is to be applied to the first transmission, receive feedback information from the UE according to the feedback configuration, and determine one or more of a number of bits or an interpretation of each bit of the feedback information based at least in part on the semi-static signaling and the dynamic signaling associated with the first transmission.

A non-transitory computer readable medium for wireless communication is described. The non-transitory computer-readable medium may include instructions operable to cause a processor to identify a feedback configuration for providing feedback of successful reception of one or more downlink transmissions to a UE, the feedback configuration based at least in part on a plurality of types of information configured for transmission to the UE that have separate feedback processes, transmit semi-static signaling to the UE that indicates the feedback configuration to be applied across a plurality of transmissions, transmit dynamic signaling associated with at least a first transmission of the plurality of transmissions, the dynamic signaling indicating how the feedback configuration is to be applied to the first transmission, receive feedback information from the UE according to the feedback configuration, and determine one or more of a number of bits or an interpretation of each bit of the feedback information based at least in part on the semi-static signaling and the dynamic signaling associated with the first transmission.

Some examples of the method, apparatus, and non-transitory computer-readable medium described above may further include processes, features, means, or instructions for determining whether one or more of the plurality of types of information of the first transmission were successfully received at the UE based at least in part on the determined number of bits or interpretation of each bit of the feedback information. In some examples of the method, apparatus, and non-transitory computer-readable medium described above, each bit of the feedback information provides ACK/NACK feedback for one or more packets, code blocks, or control messages of the first transmission.

In some examples of the method, apparatus, and non-transitory computer-readable medium described above, the semi-static signaling to the UE indicates one or more of a number of configured component carriers for the UE, a number of identifiers associated with the UE that are to be monitored for transmissions to the UE, a number of configured feedback processes that the UE may be to monitor, a number of separate transport blocks sent as separate codewords over one or more MIMO layers, a number of code block groups per transport block, threshold values for the number of bits of a set of feedback bits to trigger bundling of feedback, one or more time delay values between transmit/receive events including one or more of receipt of control information associated with a first packet and receipt of the first packet or receipt of the first packet and transmission of the feedback information associated with the first packet, an explicit configuration for the interpretation of the set of feedback bits, or any combination thereof.

In some examples of the method, apparatus, and non-transitory computer-readable medium described above, the dynamic signaling indicates one or more of a resource assignment for transmitting the feedback information, explicit dynamic signaling for the interpretation of a set of feedback bits, dynamic triggering of control information to be multiplexed with the feedback information, or any combination thereof.

In some examples of the method, apparatus, and non-transitory computer-readable medium described above, the determining comprises determining that a first number of bits are to be included in the feedback information based on the dynamic signaling, and wherein the method further comprises receiving a second number of bits of feedback from the UE and determining that the UE unsuccessfully received the dynamic signaling based at least in part on the receiving the second number of bits.

In some examples of the method, apparatus, and non-transitory computer-readable medium described above, the feedback information includes a CRC. In some examples of the method, apparatus, and non-transitory computer-readable medium described above, the dynamic signaling indicates that a subset of the set of ACK/NACK feedback bits are to be used for ACK/NACK feedback for control information associated with the first transmission. In some examples of the method, apparatus, and non-transitory computer-readable medium described above, the feedback information comprises a set of ACK/NACK feedback bits and a subset of the set of ACK/NACK feedback bits provide bundled feedback for two or more sets of packets of the first transmission.

Some examples of the method, apparatus, and non-transitory computer-readable medium described above, also include transmitting control information that indicates a change in a transmission beam or a transmission bandwidth for a second transmission.

A method of wireless communication is described. The method may include identifying a feedback configuration for providing feedback of successful reception of one or more uplink transmissions from a UE, the feedback configuration based at least in part on a plurality of types of information configured for transmission from the UE that have separate feedback processes, transmitting semi-static signaling to the UE that indicates the feedback configuration to be applied across a plurality of transmissions, transmitting dynamic signaling associated with at least a first uplink transmission of the plurality of transmissions, the dynamic signaling indicating how the feedback configuration is to be applied to the first uplink transmission, receiving the first uplink transmission from the UE, determining one or more of a number of bits or an interpretation of each bit of the feedback information based at least in part on the semi-static signaling and the dynamic signaling associated with the first uplink transmission, determining feedback information associated with the first uplink transmission, and transmitting the feedback to the UE using the determined number of bits or interpretation of each bit.

An apparatus for wireless communication is described. The apparatus may include means for identifying a feedback configuration for providing feedback of successful reception of one or more uplink transmissions from a UE, the feedback configuration based at least in part on a plurality of types of information configured for transmission from the UE that have separate feedback processes, means for transmitting semi-static signaling to the UE that indicates the feedback configuration to be applied across a plurality of transmissions, means for transmitting dynamic signaling associated with at least a first uplink transmission of the plurality of transmissions, the dynamic signaling indicating how the feedback configuration is to be applied to the first uplink transmission, means for receiving the first uplink transmission from the UE, means for determining one or more of a number of bits or an interpretation of each bit of the feedback information based at least in part on the semi-static signaling and the dynamic signaling associated with the first uplink transmission, means for determining feedback information associated with the first uplink transmission, and means for transmitting the feedback to the UE using the determined number of bits or interpretation of each bit.

Another apparatus for wireless communication is described. The apparatus may include a processor, memory in electronic communication with the processor, and instructions stored in the memory. The instructions may be operable to cause the processor to identify a feedback configuration for providing feedback of successful reception of one or more uplink transmissions from a UE, the feedback configuration based at least in part on a plurality of types of information configured for transmission from the UE that have separate feedback processes, transmit semi-static signaling to the UE that indicates the feedback configuration to be applied across a plurality of transmissions, transmit dynamic signaling associated with at least a first uplink transmission of the plurality of transmissions, the dynamic signaling indicating how the feedback configuration is to be applied to the first uplink transmission, receive the first uplink transmission from the UE, determine one or more of a number of bits or an interpretation of each bit of the feedback information based at least in part on the semi-static signaling and the dynamic signaling associated with the first uplink transmission, determine feedback information associated with the first uplink transmission, and transmit the feedback to the UE using the determined number of bits or interpretation of each bit.

A non-transitory computer readable medium for wireless communication is described. The non-transitory computer-readable medium may include instructions operable to cause a processor to identify a feedback configuration for providing feedback of successful reception of one or more uplink transmissions from a UE, the feedback configuration based at least in part on a plurality of types of information configured for transmission from the UE that have separate feedback processes, transmit semi-static signaling to the UE that indicates the feedback configuration to be applied across a plurality of transmissions, transmit dynamic signaling associated with at least a first uplink transmission of the plurality of transmissions, the dynamic signaling indicating how the feedback configuration is to be applied to the first uplink transmission, receive the first uplink transmission from the UE, determine one or more of a number of bits or an interpretation of each bit of the feedback information based at least in part on the semi-static signaling and the dynamic signaling associated with the first uplink transmission, determine feedback information associated with the first uplink transmission, and transmit the feedback to the UE using the determined number of bits or interpretation of each bit.

A method of wireless communication is described. The method may include receiving semi-static signaling from a base station that indicates a feedback configuration to be applied across a plurality of transmissions, the feedback configuration for indicating feedback of successful reception of one or more downlink transmissions from the base station that include a plurality of types of information that have separate feedback processes, receiving dynamic signaling associated with at least a first transmission of the plurality of transmissions, the dynamic signaling indicating how the feedback configuration is to be applied to the first uplink transmission, and determining one or more of a number of bits or an interpretation of each bit of feedback information for providing feedback for the first transmission based at least in part on the semi-static signaling and the dynamic signaling associated with the first transmission.

An apparatus for wireless communication is described. The apparatus may include means for receiving semi-static signaling from a base station that indicates a feedback configuration to be applied across a plurality of transmissions, the feedback configuration for indicating feedback of successful reception of one or more downlink transmissions from the base station that include a plurality of types of information that have separate feedback processes, means for receiving dynamic signaling associated with at least a first transmission of the plurality of transmissions, the dynamic signaling indicating how the feedback configuration is to be applied to the first uplink transmission, and means for determining one or more of a number of bits or an interpretation of each bit of feedback information for providing feedback for the first transmission based at least in part on the semi-static signaling and the dynamic signaling associated with the first transmission.

Another apparatus for wireless communication is described. The apparatus may include a processor, memory in electronic communication with the processor, and instructions stored in the memory. The instructions may be operable to cause the processor to receive semi-static signaling from a base station that indicates a feedback configuration to be applied across a plurality of transmissions, the feedback configuration for indicating feedback of successful reception of one or more downlink transmissions from the base station that include a plurality of types of information that have separate feedback processes, receive dynamic signaling associated with at least a first transmission of the plurality of transmissions, the dynamic signaling indicating how the feedback configuration is to be applied to the first uplink transmission, and determine one or more of a number of bits or an interpretation of each bit of feedback information for providing feedback for the first transmission based at least in part on the semi-static signaling and the dynamic signaling associated with the first transmission.

A non-transitory computer readable medium for wireless communication is described. The non-transitory computer-readable medium may include instructions operable to cause a processor to receive semi-static signaling from a base station that indicates a feedback configuration to be applied across a plurality of transmissions, the feedback configuration for indicating feedback of successful reception of one or more downlink transmissions from the base station that include a plurality of types of information that have separate feedback processes, receive dynamic signaling associated with at least a first transmission of the plurality of transmissions, the dynamic signaling indicating how the feedback configuration is to be applied to the first uplink transmission, and determine one or more of a number of bits or an interpretation of each bit of feedback information for providing feedback for the first transmission based at least in part on the semi-static signaling and the dynamic signaling associated with the first transmission.

Some examples of the method, apparatus, and non-transitory computer-readable medium described above may further include processes, features, means, or instructions for receiving the first transmission from the base station. Some examples of the method, apparatus, and non-transitory computer-readable medium described above may further include processes, features, means, or instructions for determining the feedback information for the first transmission based at least in part on the determined number of bits or the interpretation of each bit. Some examples of the method, apparatus, and non-transitory computer-readable medium described above may further include processes, features, means, or instructions for transmitting the feedback information to the base station. In some examples of the method, apparatus, and non-transitory computer-readable medium described above, the feedback information comprises a set of ACK/NACK feedback bits and each bit of the set of ACK/NACK feedback bits provides ACK/NACK feedback for one or more packets, code blocks, or control messages of the first transmission.

In some examples of the method, apparatus, and non-transitory computer-readable medium described above, the semi-static signaling indicates one or more of a number of configured component carriers, a number of identifiers that are to be monitored for transmissions, a number of configured feedback processes that are to be monitored, a number of separate transport blocks sent as separate codewords over one or more MIMO layers, a number of code block groups per transport block, threshold values for a number of bits of the feedback information to trigger bundling of feedback, one or more time delay values between transmit/receive events including one or more of receipt of control information associated with a first packet and receipt of the first packet or receipt of the first packet and transmission of the feedback information associated with the first packet, an explicit configuration for the interpretation of the feedback information, or any combination thereof.

In some examples of the method, apparatus, and non-transitory computer-readable medium described above, the dynamic signaling indicates one or more of a resource assignment for transmitting the feedback information, explicit dynamic signaling for the interpretation of the number of bits, dynamic triggering of control information to be multiplexed with the feedback information, or any combination thereof. In some examples of the method, apparatus, and non-transitory computer-readable medium described above, the feedback information includes a CRC. In some examples of the method, apparatus, and non-transitory computer-readable medium described above, the feedback information comprises a set of ACK/NACK feedback bits and the dynamic signaling indicates that a subset of the set of ACK/NACK feedback bits are to be used for ACK/NACK feedback for control information associated with the first transmission. In some examples of the method, apparatus, and non-transitory computer-readable medium described above, the feedback information comprises a set of ACK/NACK feedback bits and a subset of the set of ACK/NACK feedback bits provide bundled feedback for two or more sets of packets of the first transmission.

Some examples of the method, apparatus, and non-transitory computer-readable medium described above, also include receiving control information that indicates a change in a transmission beam or a transmission bandwidth for a next transmission of the plurality of transmissions.

A method of wireless communication is described. The method may include receiving semi-static signaling from a base station that indicates a feedback configuration to be applied across a plurality of transmissions, the feedback configuration for indicating feedback of successful reception of one or more uplink transmissions to the base station that include a plurality of types of information that have separate feedback processes, receiving dynamic signaling associated with at least a first uplink transmission of the plurality of transmissions, the dynamic signaling indicating how the feedback configuration is to be applied to the first uplink transmission, transmitting the first uplink transmission to the base station, receiving feedback information from the base station associated with the first uplink transmission, determining one or more of a number of bits or an interpretation of each bit of the feedback information based at least in part on the semi-static signaling and the dynamic signaling associated with the first uplink transmission, and determining whether one or more portions of the uplink transmission were successfully received at the base station based at least in part on the determined number of bits or interpretation of each bit.

An apparatus for wireless communication is described. The apparatus may include means for receiving semi-static signaling from a base station that indicates a feedback configuration to be applied across a plurality of transmissions, the feedback configuration for indicating feedback of successful reception of one or more uplink transmissions to the base station that include a plurality of types of information that have separate feedback processes, means for receiving dynamic signaling associated with at least a first uplink transmission of the plurality of transmissions, the dynamic signaling indicating how the feedback configuration is to be applied to the first uplink transmission, means for transmitting the first uplink transmission to the base station, means for receiving feedback information from the base station associated with the first uplink transmission, means for determining one or more of a number of bits or an interpretation of each bit of the feedback information based at least in part on the semi-static signaling and the dynamic signaling associated with the first uplink transmission, and means for determining whether one or more portions of the uplink transmission were successfully received at the base station based at least in part on the determined number of bits or interpretation of each bit.

Another apparatus for wireless communication is described. The apparatus may include a processor, memory in electronic communication with the processor, and instructions stored in the memory. The instructions may be operable to cause the processor to receive semi-static signaling from a base station that indicates a feedback configuration to be applied across a plurality of transmissions, the feedback configuration for indicating feedback of successful reception of one or more uplink transmissions to the base station that include a plurality of types of information that have separate feedback processes, receive dynamic signaling associated with at least a first uplink transmission of the plurality of transmissions, the dynamic signaling indicating how the feedback configuration is to be applied to the first uplink transmission, transmit the first uplink transmission to the base station, receive feedback information from the base station associated with the first uplink transmission, determine one or more of a number of bits or an interpretation of each bit of the feedback information based at least in part on the semi-static signaling and the dynamic signaling associated with the first uplink transmission, and determine whether one or more portions of the uplink transmission were successfully received at the base station based at least in part on the determined number of bits or interpretation of each bit.

A non-transitory computer readable medium for wireless communication is described. The non-transitory computer-readable medium may include instructions operable to cause a processor to receive semi-static signaling from a base station that indicates a feedback configuration to be applied across a plurality of transmissions, the feedback configuration for indicating feedback of successful reception of one or more uplink transmissions to the base station that include a plurality of types of information that have separate feedback processes, receive dynamic signaling associated with at least a first uplink transmission of the plurality of transmissions, the dynamic signaling indicating how the feedback configuration is to be applied to the first uplink transmission, transmit the first uplink transmission to the base station, receive feedback information from the base station associated with the first uplink transmission, determine one or more of a number of bits or an interpretation of each bit of the feedback information based at least in part on the semi-static signaling and the dynamic signaling associated with the first uplink transmission, and determine whether one or more portions of the uplink transmission were successfully received at the base station based at least in part on the determined number of bits or interpretation of each bit.

DETAILED DESCRIPTION

In wireless communications systems, such as a NR or 5G system, a UE may be configured to communicate using a number of different services, a number of different types of information, or combinations thereof, that may each have separate feedback processes. A feedback configuration for providing feedback for such separate feedback processes may be determined based on semi-static signaling and dynamic signaling. In some cases, semi-static signaling, such as radio resource control (RRC) signaling and dynamic signaling, such as downlink control information (DCI), may together provide a feedback configuration for a particular transmission. The semi-static signaling may provide a number of bits of feedback information, interpretations of the bits of feedback information, or combinations thereof. The dynamic signaling may indicate that one or more of the bits are to have one of a number of available interpretations, may indicate that one or more additional bits are to be included with feedback, of combinations thereof. Feedback techniques as discussed herein may be used to provide feedback for uplink or downlink transmissions.

In some cases, downlink assignments (e.g., physical downlink shared channel (PDSCH) assignments) can include multiple components that may require separate acknowledgement via separate feedback processes (e.g., via separate hybrid acknowledgment repeat request (HARQ) processes). For example, such different components may include PDSCH transmissions for multiple component carriers, PDSCH transmissions that can carry multiple transport blocks over different multiple input multiple output (MIMO) layers, transport blocks that have multiple code-block groups (CBGs) each with separate feedback processes, multiple independent PDSCH transmissions (e.g., with separate radio network temporary identifiers (RNTIs) for scrambling the corresponding PDCCH DCI grant), or combinations thereof. Furthermore, one or more orders may be transmitted to a UE in a downlink control channel (e.g., physical downlink control channel (PDCCH)) transmissions, such as an order indicating a beam change in a system using beamformed transmissions (for example, a system using millimeter wave (mmW) frequencies for transmissions); or an order releasing a semi-persistent scheduling (SPS) for a UE, for example. Various techniques provided herein provide for flexible schemes to communicate feedback for such multiple feedback processes and managing the associated overhead to provide efficient use of available wireless resources.

Aspects of the disclosure are initially described in the context of a wireless communications system. Aspects of the disclosure are further illustrated by and described with reference to apparatus diagrams, system diagrams, and flowcharts that relate to feedback techniques in wireless communications.

Figure 1:
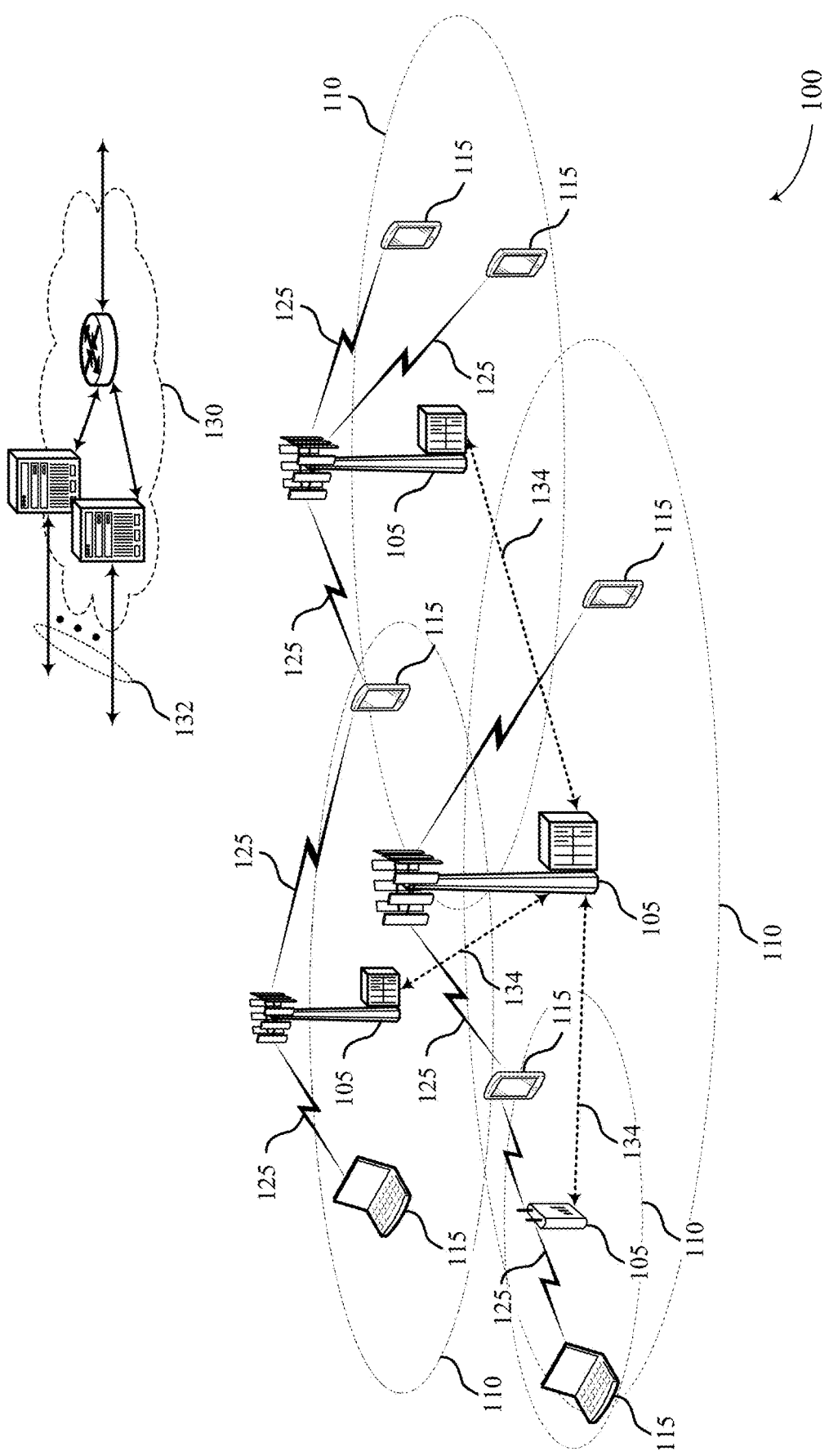
FIG. 1 illustrates an example of a system for wireless communication that supports feedback techniques in wireless communications in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Feedback may be provided for transmissions between devices in which a feedback configuration is provided using semi-static signaling and dynamic signaling, and a number and/or interpretation of feedback bits for a particular transmission may be determined based on the semi-static and dynamic signaling.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller. In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

As indicated above, in some examples a UE 115 and a base station 105 may use feedback processes to indicate successful or unsuccessful receptions of uplink or downlink transmissions. In cases where multiple different types of information may have separate feedback processes. In some cases, the number of different feedback processes may be large enough that feedback transmissions would consume a relatively large amount of wireless resources. Furthermore, while a UE 115 may be configured for transmissions that may require a number of different feedback processes, particular transmissions may include only a subset of communications that need different feedback processes, and thus the feedback may be different for different transmissions. A UE 115 or a base station 105 may determine a feedback configuration for providing feedback for such separate feedback processes based on semi-static signaling and dynamic signaling. In some cases, semi-static signaling may provide a feedback configuration, and a number of bits of feedback information, an interpretation of the bits of feedback information, or combinations thereof may be determined based on dynamic signaling. In some cases, the semi-static signaling may be transmitted through RRC signaling, and dynamic signaling may be provided through include DCI transmitted to a UE. Feedback techniques as discussed herein may be used to provide feedback for uplink or downlink transmissions.

Figure 2:
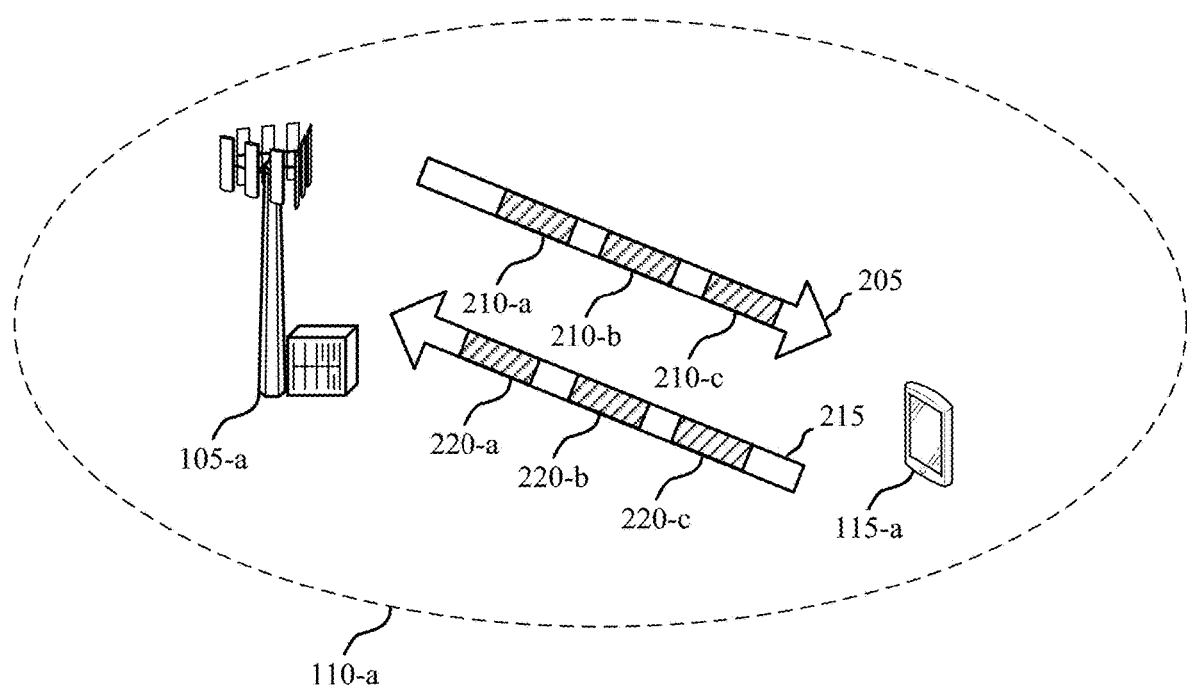
FIG. 2 illustrates an example of a wireless communications system that supports feedback techniques in wireless communications in accordance with aspects of the present disclosure.

FIG. 2 illustrates an example of a wireless communications system 200 that supports feedback techniques in wireless communications in accordance with various aspects of the present disclosure. Wireless communications system 200 includes base station 105-*a* and UE 115-*a*, which may be examples of aspects of a UE 115 as described above with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs.

Base station 105-*a* may communicate with UE 115-*a* over an uplink carrier 205 and a downlink carrier 215. In some examples, base station 105-*a* may allocate resources for communication with UEs over uplink carrier 205 and downlink carrier 215 and transmit downlink transmissions 210 via downlink carrier 215 and receive uplink transmissions 220 via uplink carrier 215. In some cases, the downlink transmissions 210 or uplink transmissions 220 may include data that has one or more associated feedback processes. For example, a first downlink transmission 210-*a* may include data that has two associated feedback processes, a second downlink transmission 210-*b* may include an order and data that are each to have separate feedback, and third downlink transmission 210-*c* may include transmissions with a transport block that has multiple CBGs that each have a separate feedback process, or that share a common feedback process which allows for separate individual ACK/NACK signaling for each CBG. The UE 115-*b* may receive each of the downlink transmissions and provide associated feedback in a first uplink transmission 220-*a* with feedback information for the two feedback processes of the first downlink transmission 210-*a*, a second uplink transmission 220-*b* with feedback information for the order and the data of the second downlink transmission 210-*b*, and a third uplink transmission 220-*c* with feedback information for the multiple CBGs of the third downlink transmission 210-*c*. While this example, as well as other examples discussed herein, illustrates a UE 115-*a* providing feedback for downlink transmissions 210, disclosed techniques may also be used for providing feedback for uplink transmissions 220 from base station 105-*b* to the UE 115.

As indicated above, the feedback configuration and a number/interpretation of feedback bits may be determined based on semi-static and dynamic signaling. In some cases, semi-static signaling, such as RRC signaling, may provide a feedback configuration, and a number of bits of feedback information, an interpretation of the bits of feedback information, or combinations thereof may be determined based on dynamic signaling. In some cases, dynamic signaling may include DCI signaling to a UE.

Figure 3:
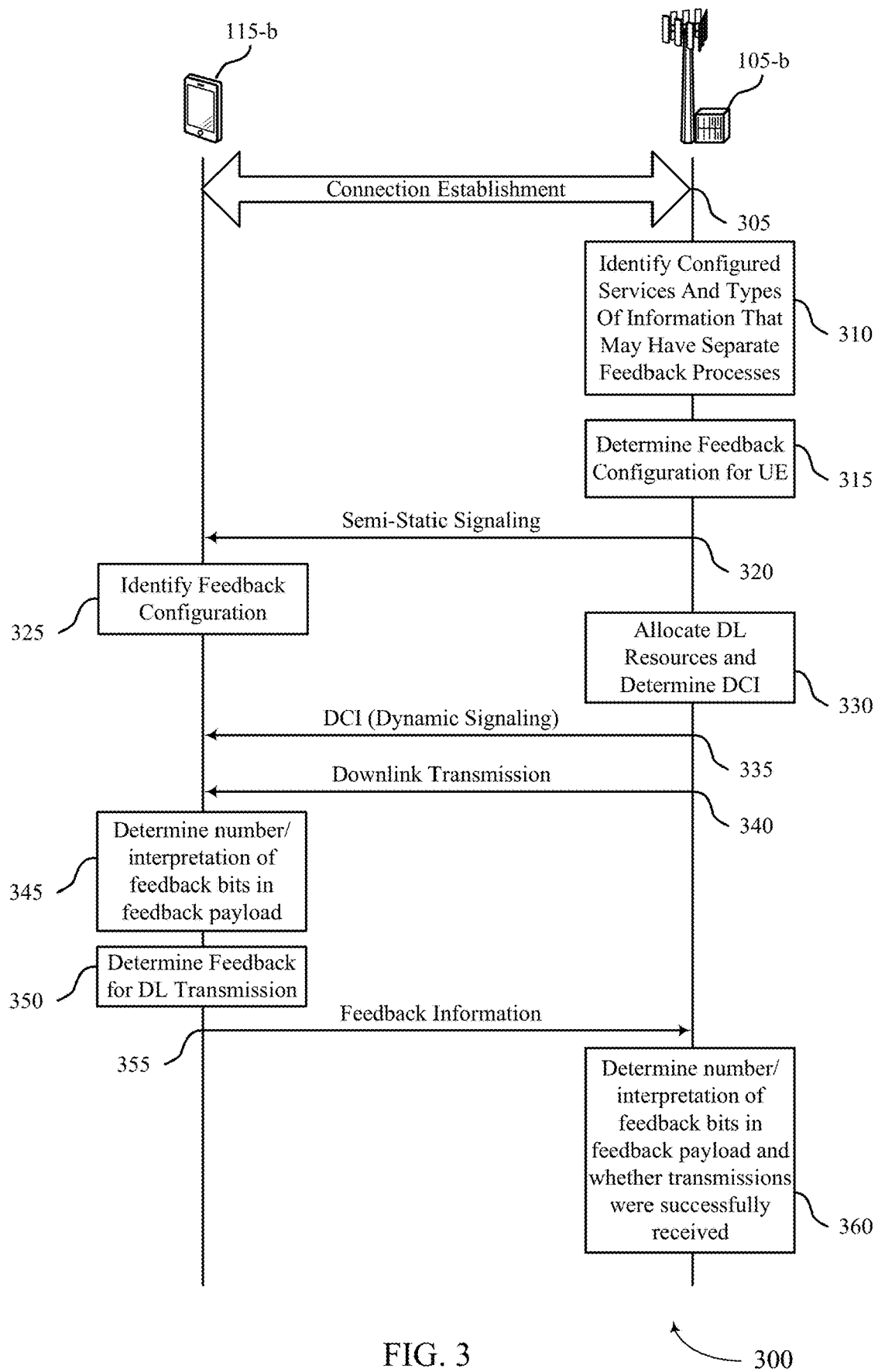
FIG. 3 illustrates an example of a process flow that supports feedback techniques in wireless communications in accordance with aspects of the present disclosure.

FIG. 3 illustrates an example of a process flow 300 that supports feedback techniques in wireless communications in accordance with various aspects of the present disclosure. Process flow 1400 may include a base station 105-*b*, and a UE 115-*b*, which may be examples of the corresponding devices described with reference to FIG. 1-2. The base station 105-*b* and the UE 115-*b* may establish a connection 305 according to connection establishment techniques for the wireless communications system.

At block 310, base station 105-*b* may identify configured services and types of information that may have separate feedback (e.g., HARQ) processes. As discussed above, such configured services and types of information with different feedback processes may include, for example, PDSCH transmissions for multiple component carriers, PDSCH transmissions that can carry multiple transport blocks over different MIMO layers, transport blocks that have multiple CBGs each with separate feedback processes, multiple independent PDSCH transmissions (e.g., with separate RNTIs for scrambling the corresponding PDCCH DCI grant), or combinations thereof. Furthermore, the UE 115-*b* may be capable of receiving one or more orders that may be transmitted in downlink control channel transmissions, such as an order indicating a beam change in a system using beamformed communications (such as a mmW system) or an order releasing a SPS, for example.

At block 315, the base station 105-*b* may determine a feedback configuration based on the different feedback processes, and may transmit the feedback configuration to the UE 115-*b* via semi-static signaling 320. In some cases, the semi-static signaling 320 may be RRC signaling transmitted to the UE 115-*b*. The semi-static signaling 320 may include information that the UE 115-*b* may use to determine feedback bit configuration or interpretation, and may include, for example, a number of configured component carriers (CCs) for the UE 115-*b*, a number of RNTIs on which to monitor grants and/or packets that have separate feedback processes, a number of configured HARQ processes the UE 115-*b* is to monitor (e.g., separate RNTIs and/or CCs could have their own independent HARQ processes, or HARQ process IDs could be assigned across RNTIs and/or CCs which may be have a pre-configured map from process ID to RNTI and/or CC), a number of separate transport blocks sent as codewords over different MIMO layers (which may be a function of RNTI, CC, HARQ process ID), a number of CBGs per transport block (which may be a function of codeword index, RNTI, CC, HARQ process), thresholds on resource assignment size on the control channel carrying the feedback payload (e.g., bundling levels to bundle more packets into a single feedback bit in case of small assignment size), a number of time delay values configured between packet receipt and feedback transmission and/or between receiving the scheduling grant and receiving the packet that it schedules, explicit RRC configuration for interpretation of certain feedback bits, or combinations thereof.

At block 325, the UE 115-b may identify the feedback configurations that are possible. Such feedback configurations may include one or more bits of feedback payload, interpretation of the feedback bits, or combinations thereof. In some cases, the semi-static information may include a number of bits of feedback payload and an indication of one or more of the semi-static signaling items as discussed above.

At block 330, the base station 105-b may allocate downlink resources and determine DCI. The downlink resources may include resources for, for example, PDSCH transmissions that are to be transmitted to the UE 115-b. The DCI may include a grant of the PDSCH resources, and in some cases may include one or more orders (e.g., a beam change or SPS release) directed to the UE 115-b. The base station 105-b may transmit the DCI 335, which in some cases may include some or all of the dynamic signaling information. The dynamic signaling may include, in some examples, one or more of resource assignment(s) for an uplink control channel carrying the feedback payload bits. In some cases, a size of the resource assignment(s) may trigger one or more bundling rules, in which feedback information for multiple feedback processes may be bundled based on assignment size thresholds. In such cases, interpretations of one or more bits of feedback payload may be changed based on the size of the uplink resource assignment(s). Interpretation could also depend on other parameters of the uplink resources assignment, such as DMRS overhead in the assignment, which could affect the number of feedback bits that can be carried, or the presence of other higher priority control information (such as a scheduling request (SR)) that may limit the number of feedback bits that can be carried, or the waveform, transmit diversity scheme, or numerology of the uplink transmission. Note that some or all of these parameters may be determined semi-statically, and some or all of them may be determined dynamically.

Additionally or alternatively, the DCI may include explicit dynamic signaling for interpretation of certain feedback bits. For example, the DCI 335 may include signaling indicates feedback information that is to be provided in certain bits of the feedback payload. For example, the DCI 335 may include signaling that CBG #i of codeword #j of CC #k of RNTI #r of HARQ process #h shall be placed at the m-th bit in the feedback payload bitfield. In some cases, the DCI may indicate a starting bit position in the feedback payload Ack bitfield corresponding to a specified subset of the noted indices (i,j,k,r,h), and feedback information for values of the remaining indices are then arranged in a pre-specified or pre-configured sequence starting from that bit position (e.g., DCI on PDCCH includes index into feedback payload bitfield at which feedback information for PDCCH is to be sent). In other cases, the DCI may, additionally or alternatively, provide dynamic triggering of other control information (e.g., SR, CSI) to be multiplexed with the feedback information (e.g., based on type and/or size of additional control information).

The base station 105-b may transmit downlink transmission 340, which may include one or more of PDSCH or PDCCH information. At block 345, the UE 115-b may determine a number/interpretation of feedback bits in feedback payload to be transmitted to provide feedback. In some cases, the number of feedback bits may be configured in the semi-static signaling. In such cases, both the UE 115-b and the base station 105-b will each know the number of bits in the feedback information, and multiple decoding hypotheses may not be needed. In such cases, any extra unused feedback bits may be transmitted with, for example, filler or padding bits for feedback processes on which UE 115-b does not have an assignment. In other cases, the number of bits included in the feedback information may be dynamic. In such cases, the dynamic signaling (e.g., DCI), may be not be successfully received at the UE 115-b, and thus the UE 115-b and base station 105-b may not be synchronized on the number of feedback bits and multiple hypotheses decoding may be needed to account for all the possibilities for missed signaling. In some cases, the feedback data may include a CRC check, and the determination of which of the multiple hypotheses may be based on the CRC as well. Such dynamic selection of the size of the feedback payload may allow control channel resources carrying the feedback information to be used more efficiently (e.g., due to dummy bits for some PDCCH orders that can be skipped if those PDCCH are not received). In some cases, the base station 105-b may configure a dynamic feedback payload size for rarely used feedback bits (e.g., feedback for a new order in the DCI), and configure semi-static feedback payload size for more frequently used feedback bits (e.g., feedback for PDSCH transmissions).

The interpretation of feedback bits may also be determined based on semi-static or dynamic signaling, or combinations thereof. As discussed above, if the control channel transmission (e.g., DCI) that signals to use the new interpretation is not successfully received at the UE 115-b, an inconsistent interpretation of feedback bits may be used at the UE 115-b and base station 105-b. In some cases, the different interpretations may be distinguishable based on the received feedback bits. For example, an important PDCCH order may indicate that it should be acknowledged by setting a set of bits in the feedback payload field to 'ACK.' If those bits earlier corresponded to different feedback processes, and no packet was scheduled that corresponds to those feedback processes, then verifying whether that set of bits were all 'ACK' may be reliable method of determining whether the PDCCH was acknowledged. Thus, bits that are provisioned but unused in a default interpretation can be reused in a new interpretation provided there is some redundancy to this interpretation, and the level of redundancy may determine the reliability with which it can be judged whether the control signaling indicating the change of interpretation was received.

The UE 115-b, at block 350, may determine feedback for the downlink transmission based on the dynamic and semi-static signaling. The UE 115-b may transmit the feedback information 355 to the base station 105-b.

As mentioned above, in some cases feedback information may include ACK/NACK data for both DCI and PDSCH transmissions. In some cases, an ACK may indicate both that the scheduling grant (e.g., DL DCI on PDCCH) was received, and the corresponding scheduled packet (e.g., DL PDSCH) was decoded (and a CRC may have passed), and a NACK may indicate that either the DCI grant was missed or the scheduled packet could not be decoded. In some cases, bits in the bitfield may include separate indication for the scheduling grant and the scheduled packet, and receipt of ACKs in the bitfield may indicate a decode success on both PDCCH and PDSCH. In such cases, such results may be used for separate power control and/or beam management of PDCCH and PDSCH. In some cases, such separate bits may be reserved for a subset of RNTI/CC/HARQ processes, so as to limit the number of ACK/NACK bits to be transmitted, and thus achieve reliable uplink coverage.

As also discussed above, in some cases feedback for two or more feedback processes may be bundled. Such bundling may provide a dynamically technique to make space in the feedback payload bitfield for an extra sporadic acknowledgment, without provisioning for it all the time, and without a need to increase the feedback payload size dynamically (and thereby increasing the number of decode hypotheses for the module receiving the acknowledgments). In such cases, two or more sets of downlink packets that have separate feedback processes may be bundled into a single bit. In such a case, an ACK may indicates ACK for all sets, and NACK indicates a NACK for at least one of the sets. In some cases, if the assignment grants for some of these sets of packets are missed, and the others are received and decoded, an ACK may be incorrectly sent. In some cases, an indication may be provided with the feedback information that indicates how many sets are being acknowledged. In other cases, the bundling request may also indicate how many sets are actually transmitted, so ACK/NACK can be generated accordingly. In particular, it may indicate either implicitly or explicitly that all sets were transmitted. In still other cases, the bundling request indicates information about the scheduling grants that schedule the packets for which the feedback are to be bundled, which may be used to verify that those scheduling grants were decoded. Such information may be at least one of a time location, frequency location, and a count of the scheduling grants. Additionally, in some cases, feedback configuration may be determined based on a delay value between a downlink grant or DCI information and the downlink transmission, a delay value between the downlink transmission and an associated transmission of feedback information, or combinations thereof, as discussed in more detail below with respect to FIG. 4.

At block 360, the base station 105-*b* may determine number/interpretation of feedback bits in feedback payload and whether transmissions were successfully received, based on the semi-static signaling, the dynamic signaling, and the received feedback information 355.

As indicated above, while the examples discussed here are directed to downlink transmissions that are acknowledged by UE 115-*b*, techniques describe herein may also be applied to uplink transmissions that are acknowledged by the base station 105-*b*. In some cases, resource allocation size for the downlink control channel carrying such feedback information may refer to PDCCH aggregation level. Similar to feedback for PDCCH orders, one or more ACKs may be provided for receipt of certain UCI such as SRS or SR or BSR. Furthermore, ACKs for downlink transmissions may not be explicitly scheduled in advance, and in some cases may be sent on PDCCH and blind-detected by UE. In some cases, the interpretation for such feedback may be included in the same PDCCH to allow dynamic change of both payload size and interpretation of the bits, without need for any additional multiple hypothesis decoding at UE to receive the feedback. This interpretation could be conveyed by the DCI format, or by bits within the DCI, or implicitly by the downlink resources on which the DCI is transmitted.

Figure 4A:
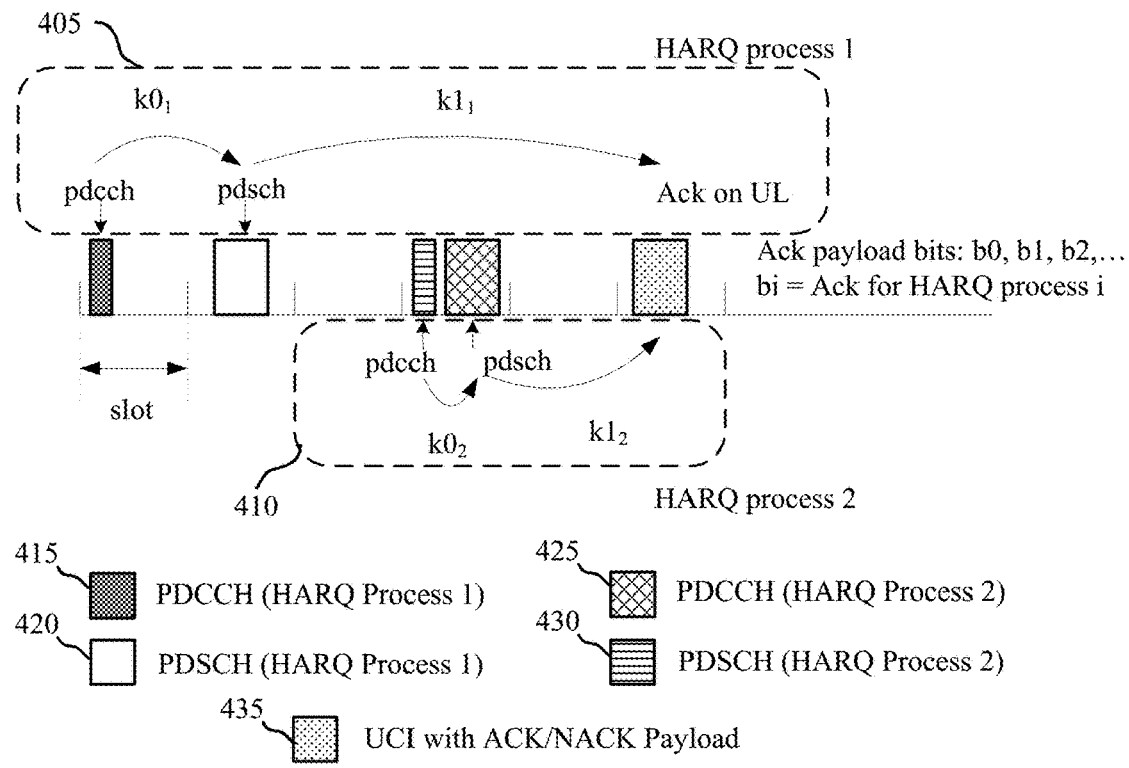
FIGS. 4A and 4B illustrate an example of delay timings in accordance with aspects of the present disclosure.
Figure 4B:
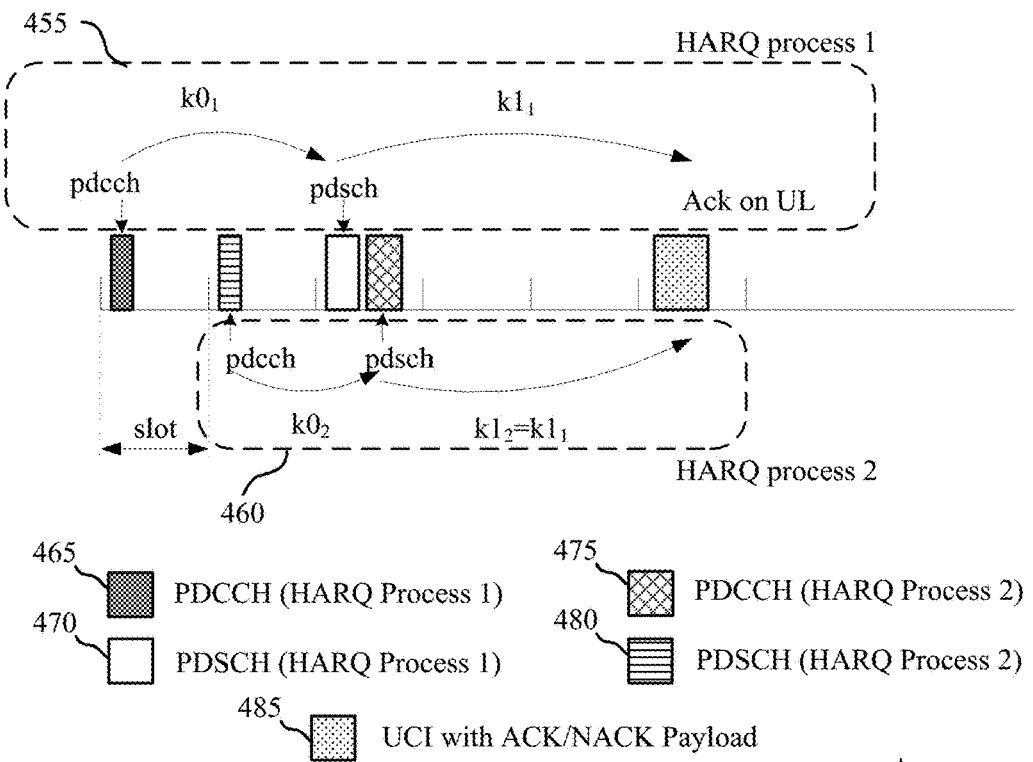

FIGS. 4A and 4B illustrate examples of delay timings 400 and 450 that may be used in feedback techniques in wireless communications in accordance with various aspects of the present disclosure. In some examples, delay timings 400 and 450 may be used to implement aspects of wireless communications system 100.

In the example of FIG. 4A, a first HARQ process 405 and a second HARQ process 410 may be configured. A first PDCCH transmission 415 may schedule a first PDSCH transmission 420 that may be associated with the first HARQ process 405, and a second PDCCH transmission 425 may schedule a second PDSCH transmission 430 that may be associated with the second HARQ process 410, and ACK/NACK feedback for both HARQ processes may be transmitted in UCI 435. In some examples, a number/interpretation of feedback bits may be based, at least in part, on different delay values between different transmissions. In this example, a first delay value, k0, corresponds to a delay between a downlink grant (e.g., on first PDCCH transmission 415) and DL assignment (e.g., on the first PDSCH transmission 420), and a second delay value, k1, corresponds to a delay between the downlink assignment and its feedback transmission sent on UCI transmission 435. For example, the base station may configure a set of k1 values and distinguish feedback transmissions for packets received at a UE on different slots but sent within same UCI based on their k1 values.

However, different k0 values can lead to multiple HARQ processes having the same k1 value. In the example of FIG. 4B, a first HARQ process 455 may have a same k1 value as a second HARQ process 460. In this example, a first PDCCH transmission 465 may have an associated first PDSCH transmission 470 after a relatively long k0 value (e.g., which may indicate a change in a transmission beam or transmission bandwidth), and the second PDCCH transmission 475 may have an associated second PDCH transmission 480 with a shorter k0 value, such that the k1 values for each of the HARQ processes is the same due to feedback being transmitted in a same UCI transmission 485. In some cases, such potential same k1 values may be accounted for by provisioning a feedback bitfield for all these multiple processes in the event that such occurrences are relatively frequent. In other cases, such events may occur relatively infrequently, and may be accounted for by using additional bits in the feedback payload, or by bundling feedback for multiple processes together. In further cases, both the k0 and k1 values may be used to determine a number/interpretation of feedback bits. In some cases, a set of feedback bits in the feedback payload may be reserved and mapped to multiple combinations of (k0,k1). In further cases, feedback bits may be ordered/distinguished based on HARQ process ID instead of k0/k1 values.

Figure 5:
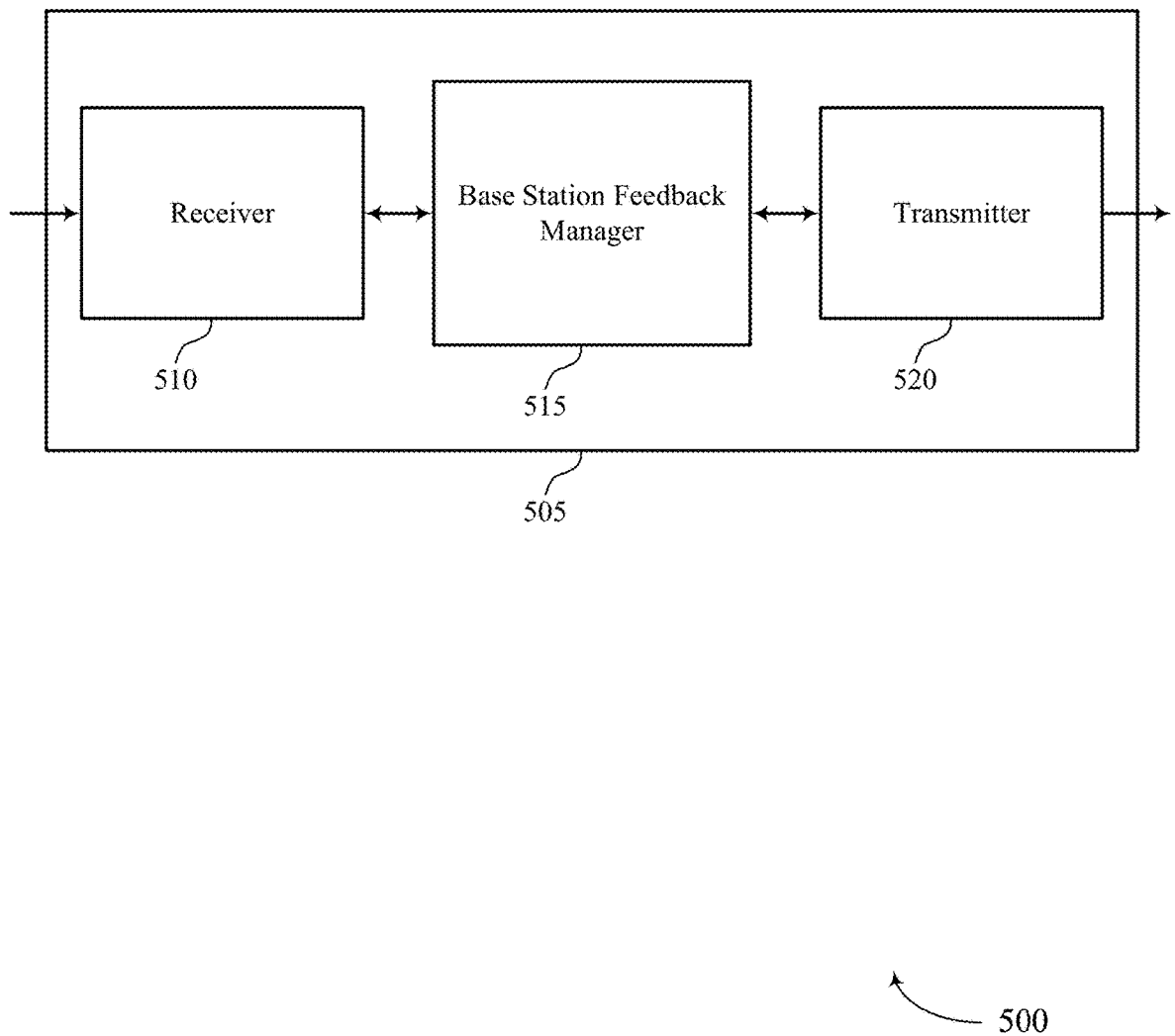
FIGS. 5 through 7 show block diagrams of a device that supports feedback techniques in wireless communications in accordance with aspects of the present disclosure.

FIG. 5 shows a block diagram 500 of a wireless device 505 that supports feedback techniques in wireless communications in accordance with aspects of the present disclosure. Wireless device 505 may be an example of aspects of a base station 105 as described herein. Wireless device 505 may include receiver 510, base station feedback manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to feedback techniques in wireless communications, etc.). Information may be passed on to other components of the device. The receiver 510 may be an example of aspects of the transceiver 835 described with reference to FIG. 8. The receiver 510 may utilize a single antenna or a set of antennas.

Base station feedback manager 515 may be an example of aspects of the base station feedback manager 815 described with reference to FIG. 8.

Base station feedback manager 515 and/or at least some of its various sub-components may be implemented in hardware, software executed by a processor, firmware, or any combination thereof. If implemented in software executed by a processor, the functions of the base station feedback manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station feedback manager 515 and/or at least some of its various sub-components may be physically located at various positions, including being distributed such that portions of functions are implemented at different physical locations by one or more physical devices. In some examples, base station feedback manager 515 and/or at least some of its various sub-components may be a separate and distinct component in accordance with various aspects of the present disclosure. In other examples, base station feedback manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station feedback manager 515 may identify a feedback configuration for providing feedback of successful reception of one or more downlink transmissions to a UE, the feedback configuration based on a set of types of information configured for transmission to the UE that have separate feedback processes, transmit semi-static signaling to the UE that indicates the feedback configuration to be applied across a set of transmissions, transmit dynamic signaling associated with at least a first transmission of the set of transmissions, the dynamic signaling indicating configuration is to be applied to the first transmission, receive feedback information from the UE according to the feedback configuration, and determine one or more of a number of bits or an interpretation of each bit of the feedback information based on the semi-static signaling and the dynamic signaling associated with the first transmission.

In some cases, the base station feedback manager 515 may also identify a feedback configuration for providing feedback of successful reception of one or more uplink transmissions from a UE, the feedback configuration based on a set of types of information configured for transmission from the UE that have separate feedback processes, transmit semi-static signaling to the UE that indicates the feedback configuration to be applied across a set of transmissions, transmit dynamic signaling associated with at least a first uplink transmission of the set of transmissions, the dynamic signaling indicating configuration is to be applied to the first uplink transmission, receive the first uplink transmission from the UE, determine one or more of a number of bits or an interpretation of each bit of the feedback information based on the semi-static signaling and the dynamic signaling associated with the first uplink transmission, determine feedback information associated with the first uplink transmission, and transmit the feedback to the UE using the determined number of bits or interpretation of each bit.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
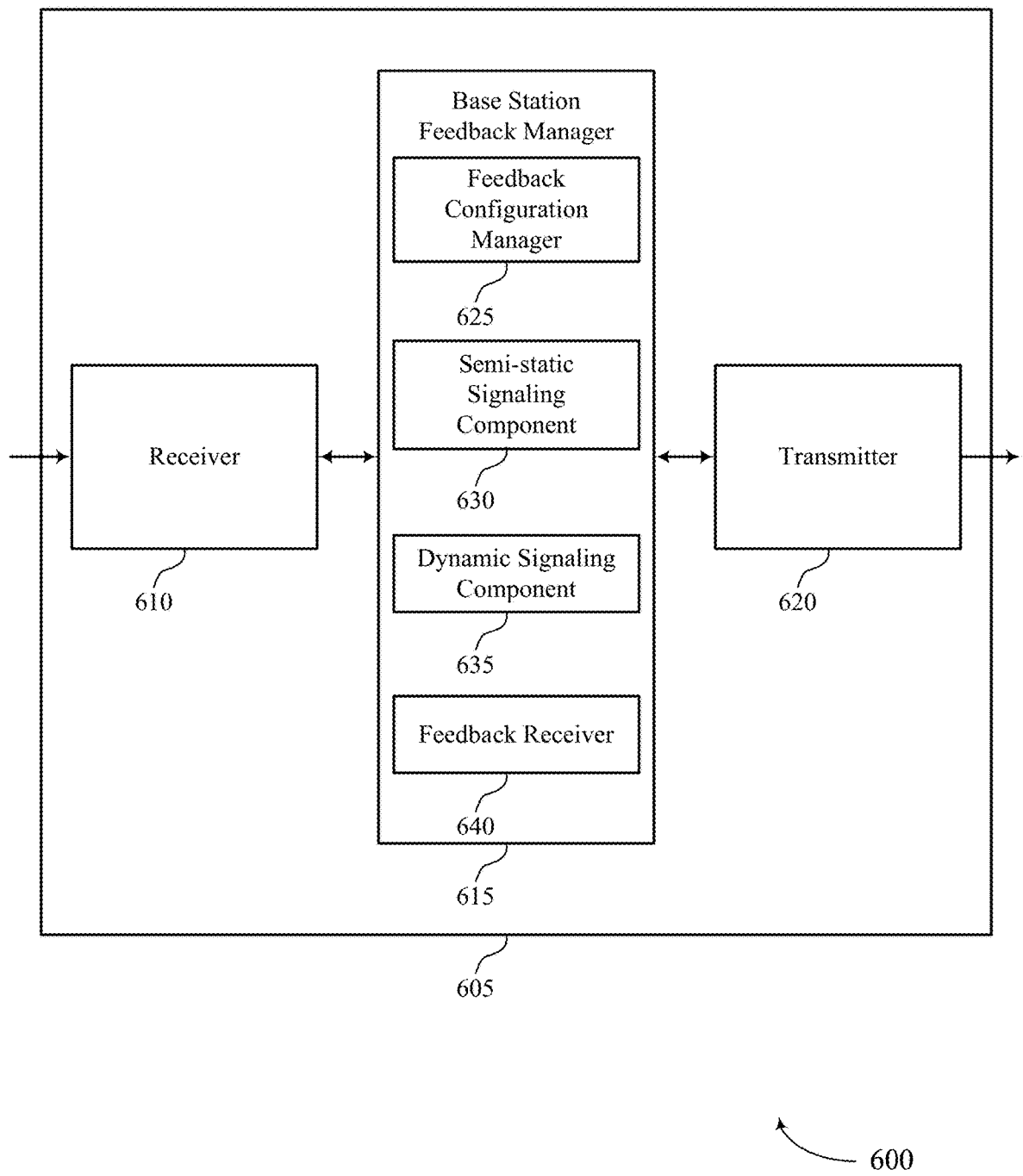

FIG. 6 shows a block diagram 600 of a wireless device 605 that supports feedback techniques in wireless communications in accordance with aspects of the present disclosure. Wireless device 605 may be an example of aspects of a wireless device 505 or a base station 105 as described with reference to FIG. 5. Wireless device 605 may include receiver 610, base station feedback manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to feedback techniques in wireless communications, etc.). Information may be passed on to other components of the device. The receiver 610 may be an example of aspects of the transceiver 835 described with reference to FIG. 8. The receiver 610 may utilize a single antenna or a set of antennas.

Base station feedback manager 615 may be an example of aspects of the base station feedback manager 815 described with reference to FIG. 8. Base station feedback manager 615 may also include feedback configuration manager 625, semi-static signaling component 630, dynamic signaling component 635, and feedback receiver 640.

Feedback configuration manager 625 may identify a feedback configuration for providing feedback of successful reception of one or more downlink transmissions to a UE, the feedback configuration based on a set of types of information configured for transmission to the UE that have separate feedback processes, determine one or more of a number of bits or an interpretation of each bit of the feedback information based on semi-static signaling and dynamic signaling associated with a first transmission. In some cases, the set of types of information include one or more of PDSCH for multiple component carriers, multiple transport blocks over multiple MIMO layers that may each have multiple code-block groups each with separate feedback processes, multiple independent PDSCH transmissions that may have separate RNTIs for scrambling the corresponding PDCCH DCI grant, one or more PDCCH orders with separate feedback processes such as an order indicating a beam change or a downlink SPS release, or combinations thereof.

In some cases, the determining is based on a base feedback configuration provided in the semi-static signaling which indicates a number of feedback bits and an interpretation of each feedback bit based on one or more of the set of types of information and an indication of which of the set of types of information are included with the first transmission. In some cases, the determining includes determining that a first number of bits are to be included in the feedback information based on the dynamic signaling, and the base station may receive a second number of bits of feedback from the UE and determine that the UE unsuccessfully received the dynamic signaling based on the receiving the second number of bits. In some cases, the feedback information includes a set of ACK/NACK feedback bits and a subset of the set of ACK/NACK feedback bits provide bundled feedback for two or more sets of packets of the first transmission.

Semi-static signaling component 630 may transmit semi-static signaling to the UE that indicates the feedback configuration to be applied across a set of transmissions. In some cases, the semi-static signaling is transmitted in RRC signaling to the UE and the dynamic signaling is provided in DCI transmitted to the UE for the first transmission. In some cases, the semi-static signaling to the UE indicates one or more of a number of configured component carriers for the UE, a number of identifiers associated with the UE that are to be monitored for transmissions to the UE, a number of configured feedback processes that the UE is to monitor, a number of separate transport blocks sent as separate codewords over one or more MIMO layers, a number of code block groups per transport block, threshold values for the number of bits of a set of feedback bits to trigger bundling of feedback, one or more time delay values between transmit/receive events including one or more of receipt of control information associated with a first packet and receipt of the first packet or receipt of the first packet and transmission of the feedback information associated with the first packet, an explicit configuration for the interpretation of the set of feedback bits, or any combination thereof.

Dynamic signaling component 635 may transmit dynamic signaling associated with at least a first transmission of the set of transmissions, the dynamic signaling indicating configuration is to be applied to the first transmission. In some cases, the dynamic signaling indicates one or more of a resource assignment for transmitting the feedback information, explicit dynamic signaling for the interpretation of a set of feedback bits, dynamic triggering of control information to be multiplexed with the feedback information, or any combination thereof. In some cases, the dynamic signaling indicates that a subset of the set of ACK/NACK feedback bits are to be used for ACK/NACK feedback for control information associated with the first transmission.

Feedback receiver 640 may receive feedback information from the UE according to the feedback configuration, receive the first uplink transmission from the UE, and determine feedback information associated with the first uplink transmission.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
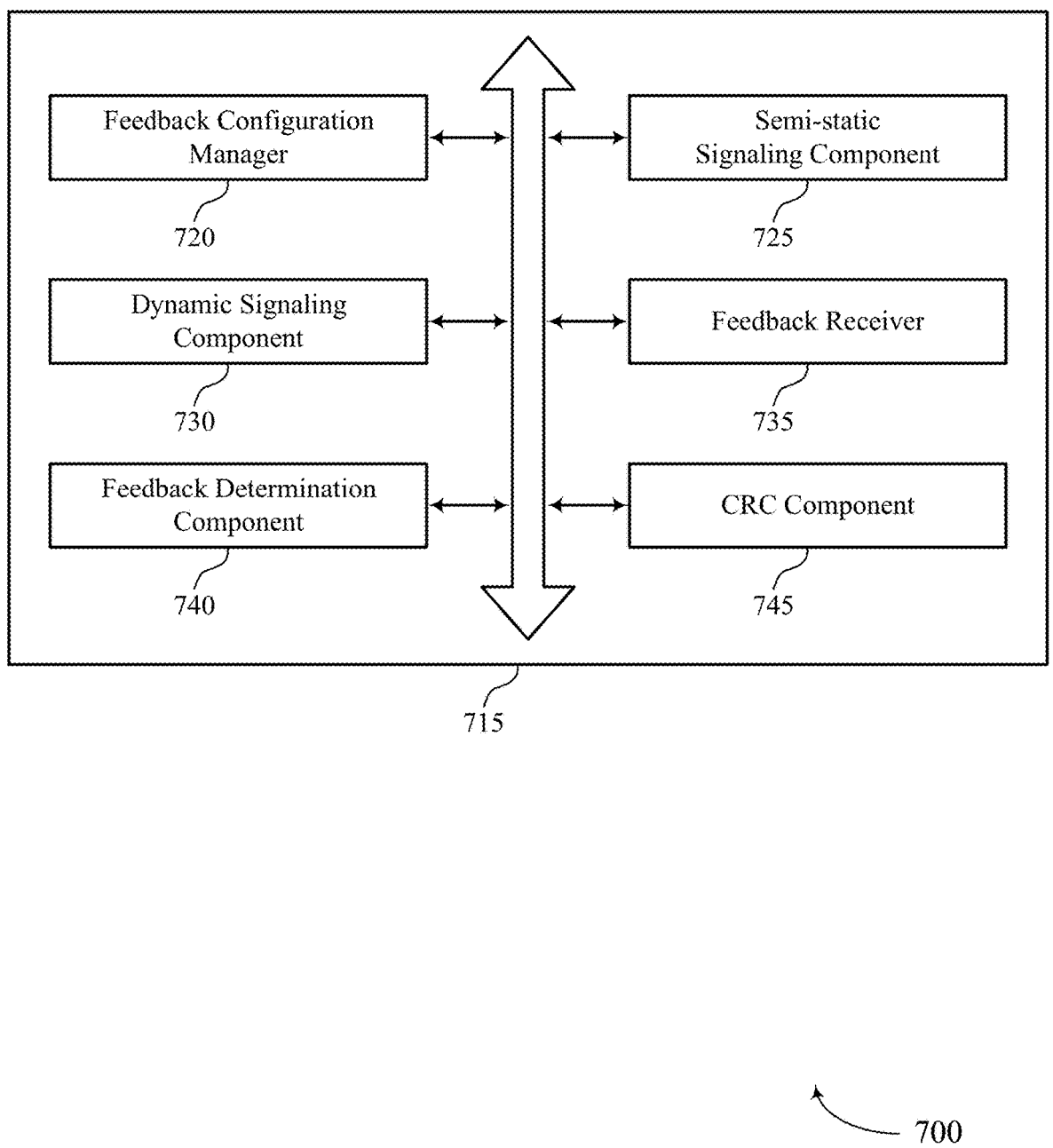

FIG. 7 shows a block diagram 700 of a base station feedback manager 715 that supports feedback techniques in wireless communications in accordance with aspects of the present disclosure. The base station feedback manager 715 may be an example of aspects of a base station feedback manager 515, a base station feedback manager 615, or a base station feedback manager 815 described with reference to FIGS. 5, 6, and 8. The base station feedback manager 715 may include feedback configuration manager 720, semi-static signaling component 725, dynamic signaling component 730, feedback receiver 735, feedback determination component 740, and cyclic redundancy check (CRC) component 745. Each of these modules may communicate, directly or indirectly, with one another (e.g., via one or more buses).

Feedback configuration manager 720 may identify a feedback configuration for providing feedback of successful reception of one or more downlink transmissions to a UE, the feedback configuration based on a set of types of information configured for transmission to the UE that have separate feedback processes, determine one or more of a number of bits or an interpretation of each bit of the feedback information based on semi-static signaling and dynamic signaling associated with a first transmission. In some cases, the set of types of information include one or more of PDSCH for multiple component carriers, multiple transport blocks over multiple MIMO layers that may each have multiple code-block groups each with separate feedback processes, multiple independent PDSCH transmissions that may have separate RNTIs for scrambling the corresponding PDCCH DCI grant, one or more PDCCH orders with separate feedback processes such as an order indicating a beam change or a downlink SPS release, or combinations thereof.

In some cases, the determining is based on a base feedback configuration provided in the semi-static signaling which indicates a number of feedback bits and an interpretation of each feedback bit based on one or more of the set of types of information and an indication of which of the set of types of information are included with the first transmission. In some cases, the determining includes determining that a first number of bits are to be included in the feedback information based on the dynamic signaling, and the base station may receive a second number of bits of feedback from the UE and determine that the UE unsuccessfully received the dynamic signaling based on the receiving the second number of bits. In some cases, the feedback information includes a set of ACK/NACK feedback bits and a subset of the set of ACK/NACK feedback bits provide bundled feedback for two or more sets of packets of the first transmission.

Semi-static signaling component 725 may transmit semi-static signaling to the UE that indicates the feedback configuration to be applied across a set of transmissions. In some cases, the semi-static signaling is transmitted in RRC signaling to the UE and the dynamic signaling is provided in DCI transmitted to the UE for the first transmission. In some cases, the semi-static signaling to the UE indicates one or more of a number of configured component carriers for the UE, a number of identifiers associated with the UE that are to be monitored for transmissions to the UE, a number of configured feedback processes that the UE is to monitor, a number of separate transport blocks sent as separate codewords over one or more MIMO layers, a number of code block groups per transport block, threshold values for the number of bits of a set of feedback bits to trigger bundling of feedback, one or more time delay values between transmit/receive events including one or more of receipt of control information associated with a first packet and receipt of the first packet or receipt of the first packet and transmission of the feedback information associated with the first packet, an explicit configuration for the interpretation of the set of feedback bits, or any combination thereof.

Dynamic signaling component 730 may transmit dynamic signaling associated with at least a first transmission of the set of transmissions, the dynamic signaling indicating configuration is to be applied to the first transmission. In some cases, the dynamic signaling indicates one or more of a resource assignment for transmitting the feedback information, explicit dynamic signaling for the interpretation of a set of feedback bits, dynamic triggering of control information to be multiplexed with the feedback information, or any combination thereof. In some cases, the dynamic signaling indicates that a subset of the set of ACK/NACK feedback bits are to be used for ACK/NACK feedback for control information associated with the first transmission.

Feedback receiver 735 may receive feedback information from the UE according to the feedback configuration, receive the first uplink transmission from the UE, and determine feedback information associated with the first uplink transmission.

Feedback determination component 740 may determine whether one or more of the set of types of information of the first transmission were successfully received at the UE based on the determined number of bits or interpretation of each bit of the feedback information. In some cases, each bit of the feedback information provides ACK/NACK feedback for one or more packets, code blocks, or control messages of the first transmission. CRC component 745 may compute a CRC for the feedback information.

Figure 8:
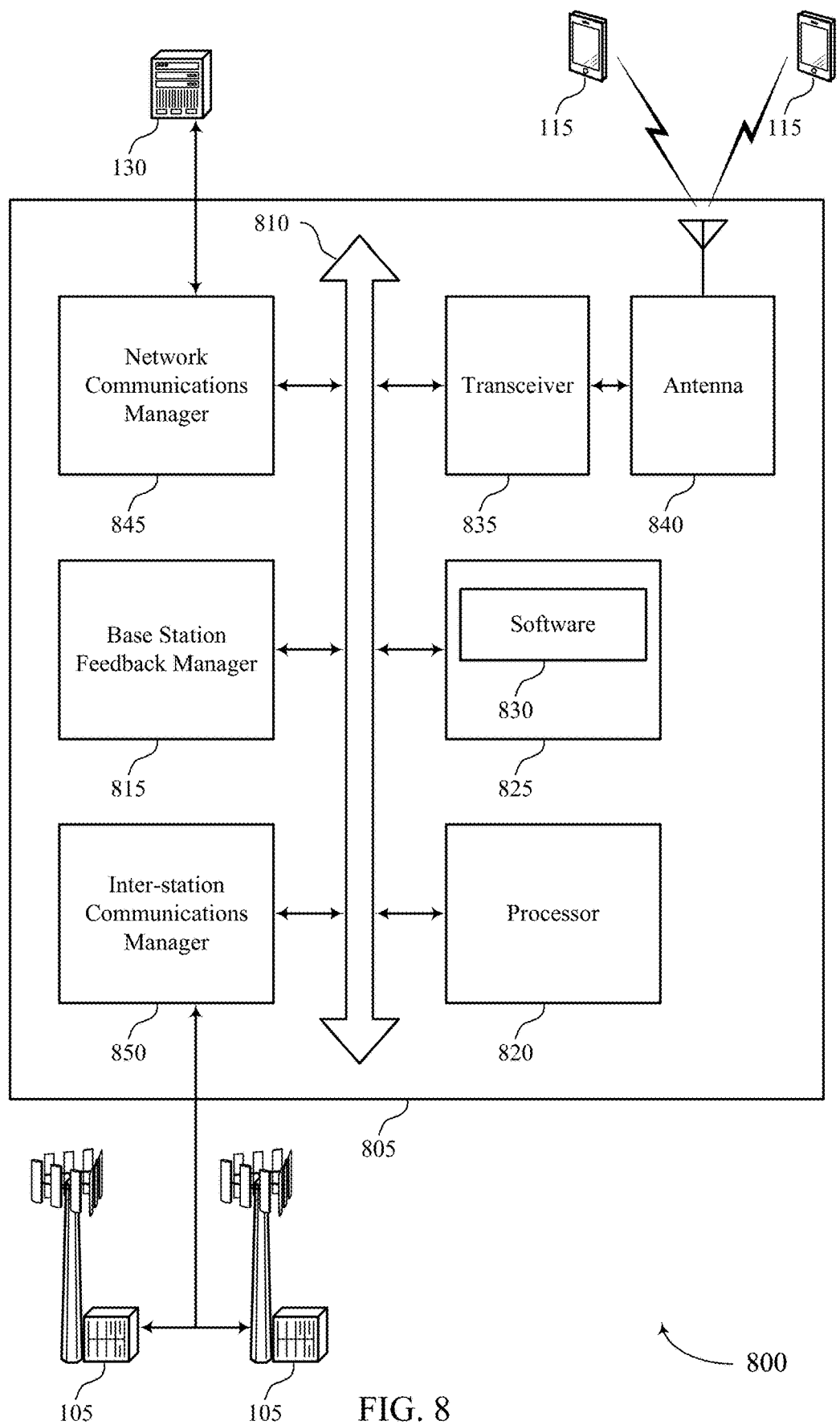
FIG. 8 illustrates a block diagram of a system including a base station that supports feedback techniques in wireless communications in accordance with aspects of the present disclosure.

FIG. 8 shows a diagram of a system 800 including a device 805 that supports feedback techniques in wireless communications in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station feedback manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting feedback techniques in wireless communications).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support feedback techniques in wireless communications. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
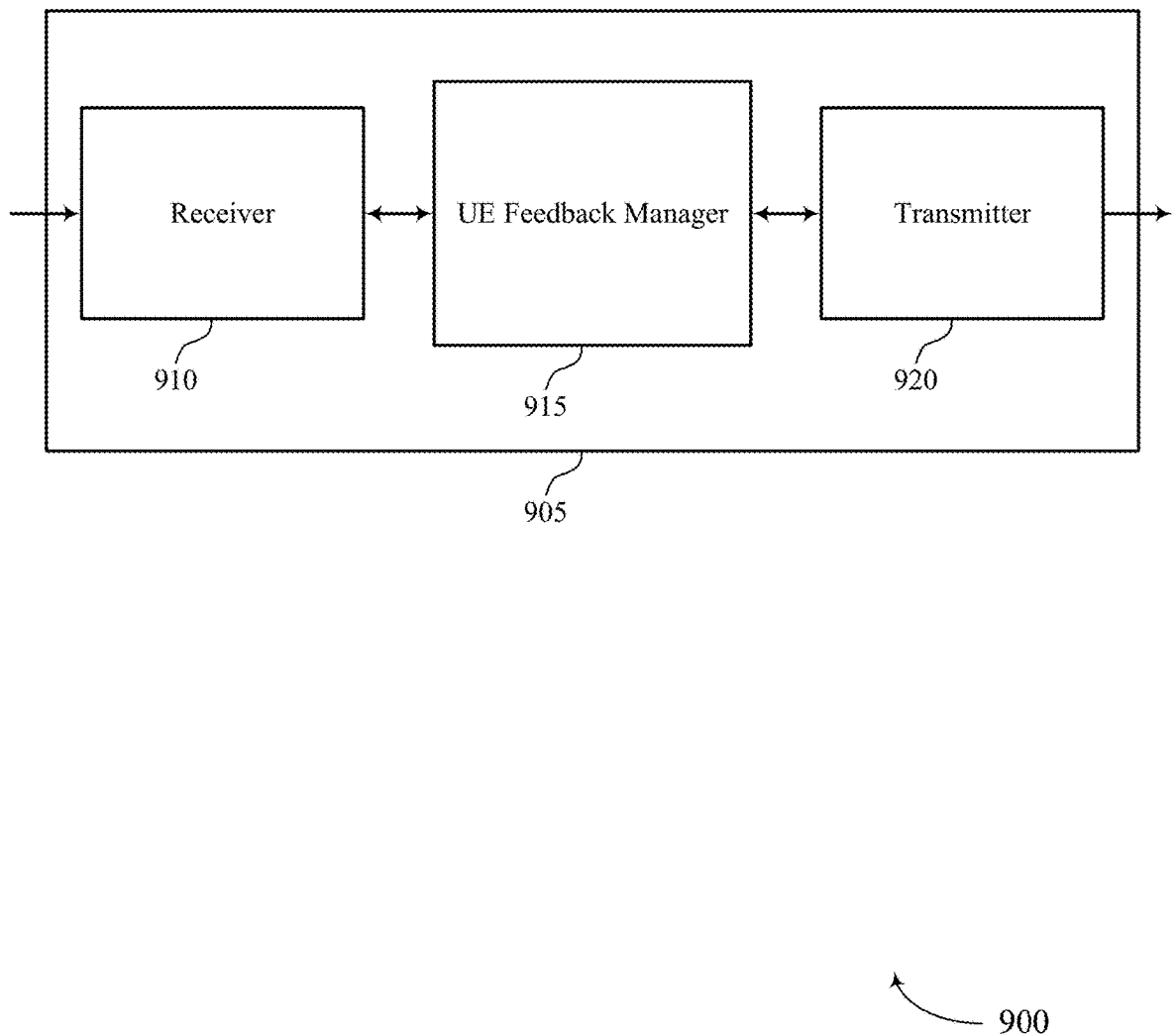
FIGS. 9 through 11 show block diagrams of a device that supports feedback techniques in wireless communications in accordance with aspects of the present disclosure.

FIG. 9 shows a block diagram 900 of a wireless device 905 that supports feedback techniques in wireless communications in accordance with aspects of the present disclosure. Wireless device 905 may be an example of aspects of a UE 115 as described herein. Wireless device 905 may include receiver 910, UE feedback manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to feedback techniques in wireless communications, etc.). Information may be passed on to other components of the device. The receiver 910 may be an example of aspects of the transceiver 1235 described with reference to FIG. 12. The receiver 910 may utilize a single antenna or a set of antennas.

UE feedback manager 915 may be an example of aspects of the UE feedback manager 1215 described with reference to FIG. 12. UE feedback manager 915 and/or at least some of its various sub-components may be implemented in hardware, software executed by a processor, firmware, or any combination thereof. If implemented in software executed by a processor, the functions of the UE feedback manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE feedback manager 915 and/or at least some of its various sub-components may be physically located at various positions, including being distributed such that portions of functions are implemented at different physical locations by one or more physical devices. In some examples, UE feedback manager 915 and/or at least some of its various sub-components may be a separate and distinct component in accordance with various aspects of the present disclosure. In other examples, UE feedback manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE feedback manager 915 may receive semi-static signaling from a base station that indicates a feedback configuration to be applied across a set of transmissions, the feedback configuration for indicating feedback of successful reception of one or more downlink transmissions from the base station that include a set of types of information that have separate feedback processes, receive dynamic signaling associated with at least a first transmission of the set of transmissions, the dynamic signaling indicating configuration is to be applied to the first uplink transmission, and determine one or more of a number of bits or an interpretation of each bit of feedback information for providing feedback for the first transmission based on the semi-static signaling and the dynamic signaling associated with the first transmission.

The UE feedback manager 915 may also receive semi-static signaling from a base station that indicates a feedback configuration to be applied across a set of transmissions, the feedback configuration for indicating feedback of successful reception of one or more uplink transmissions to the base station that include a set of types of information that have separate feedback processes, receive dynamic signaling associated with at least a first uplink transmission of the set of transmissions, the dynamic signaling indicating configuration is to be applied to the first uplink transmission, receive feedback information from the base station associated with the first uplink transmission, determine one or more of a number of bits or an interpretation of each bit of the feedback information based on the semi-static signaling and the dynamic signaling associated with the first uplink transmission, and determine whether one or more portions of the uplink transmission were successfully received at the base station based on the determined number of bits or interpretation of each bit.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
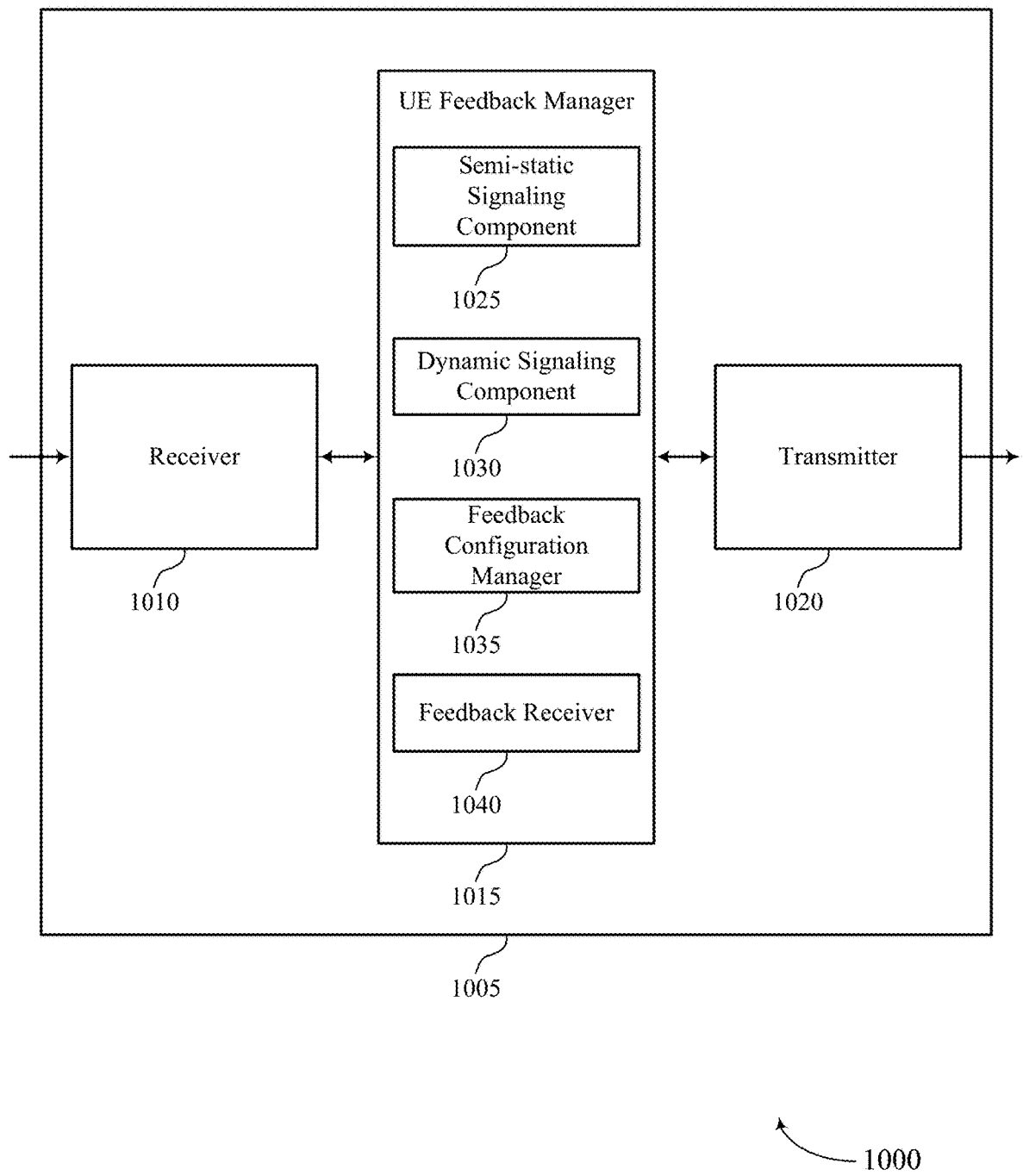

FIG. 10 shows a block diagram 1000 of a wireless device 1005 that supports feedback techniques in wireless communications in accordance with aspects of the present disclosure. Wireless device 1005 may be an example of aspects of a wireless device 905 or a UE 115 as described with reference to FIG. 9. Wireless device 1005 may include receiver 1010, UE feedback manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to feedback techniques in wireless communications, etc.). Information may be passed on to other components of the device. The receiver 1010 may be an example of aspects of the transceiver 1235 described with reference to FIG. 12. The receiver 1010 may utilize a single antenna or a set of antennas.

UE feedback manager 1015 may be an example of aspects of the UE feedback manager 1215 described with reference to FIG. 12. UE feedback manager 1015 may also include semi-static signaling component 1025, dynamic signaling component 1030, feedback configuration manager 1035, and feedback receiver 1040.

Semi-static signaling component 1025 may receive semi-static signaling from a base station that indicates a feedback configuration to be applied across a set of transmissions, the feedback configuration for indicating feedback of successful reception of one or more downlink transmissions from the base station that include a set of types of information that have separate feedback processes. In some cases, the semi-static signaling is transmitted in RRC signaling to the UE and the dynamic signaling is provided in DCI transmitted to the UE for the first transmission. In some cases, the semi-static signaling indicates one or more of a number of configured component carriers, a number of identifiers that are to be monitored for transmissions, a number of configured feedback processes that are to be monitored, a number of separate transport blocks sent as separate codewords over one or more MIMO layers, a number of code block groups per transport block, threshold values for a number of bits of the feedback information to trigger bundling of feedback, one or more time delay values between transmit/receive events including one or more of receipt of control information associated with a first packet and receipt of the first packet or receipt of the first packet and transmission of the feedback information associated with the first packet, an explicit configuration for the interpretation of the feedback information, or any combination thereof.

Dynamic signaling component 1030 may receive dynamic signaling associated with at least a first transmission of the set of transmissions, the dynamic signaling indicating configuration is to be applied to the first uplink transmission and receive dynamic signaling associated with at least a first uplink transmission of the set of transmissions, the dynamic signaling indicating how the feedback configuration is to be applied to the first uplink transmission. In some cases, the dynamic signaling indicates one or more of a resource assignment for transmitting the feedback information, explicit dynamic signaling for the interpretation of the number of bits, dynamic triggering of control information to be multiplexed with the feedback information, or any combination thereof.

Feedback configuration manager 1035 may determine one or more of a number of bits or an interpretation of each bit of feedback information for providing feedback for the first transmission based on the semi-static signaling and the dynamic signaling associated with the first transmission. In some cases, the set of types of information include one or more of PDSCH for multiple component carriers, multiple transport blocks over multiple MIMO layers that may each have multiple code-block groups each with separate feedback processes, multiple independent PDSCH transmissions that may have separate RNTIs for scrambling the corresponding PDCCH DCI grant, one or more PDCCH orders with separate feedback processes such as an order indicating a beam change or a downlink SPS release, or combinations thereof. In some cases, the feedback information includes a set of ACK/NACK feedback bits and each bit of the set of ACK/NACK feedback bits provides ACK/NACK feedback for one or more packets, code blocks, or control messages of the first transmission. In some cases, the determining is based on a feedback configuration provided in the semi-static signaling which indicates a number of feedback bits and an interpretation of each feedback bit based on one or more of the set of types of information and an indication of which of the set of types of information are included with the first transmission. In some cases, the feedback information includes a set of ACK/NACK feedback bits and the dynamic signaling indicates that a subset of the set of ACK/NACK feedback bits are to be used for ACK/NACK feedback for control information associated with the first transmission. In some cases, the feedback information includes a set of ACK/NACK feedback bits and a subset of the set of ACK/NACK feedback bits provide bundled feedback for two or more sets of packets of the first transmission.

Feedback receiver 1040 may receive feedback information from the base station associated with the first uplink transmission and determine whether one or more portions of the uplink transmission were successfully received at the base station based on the determined number of bits or interpretation of each bit.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
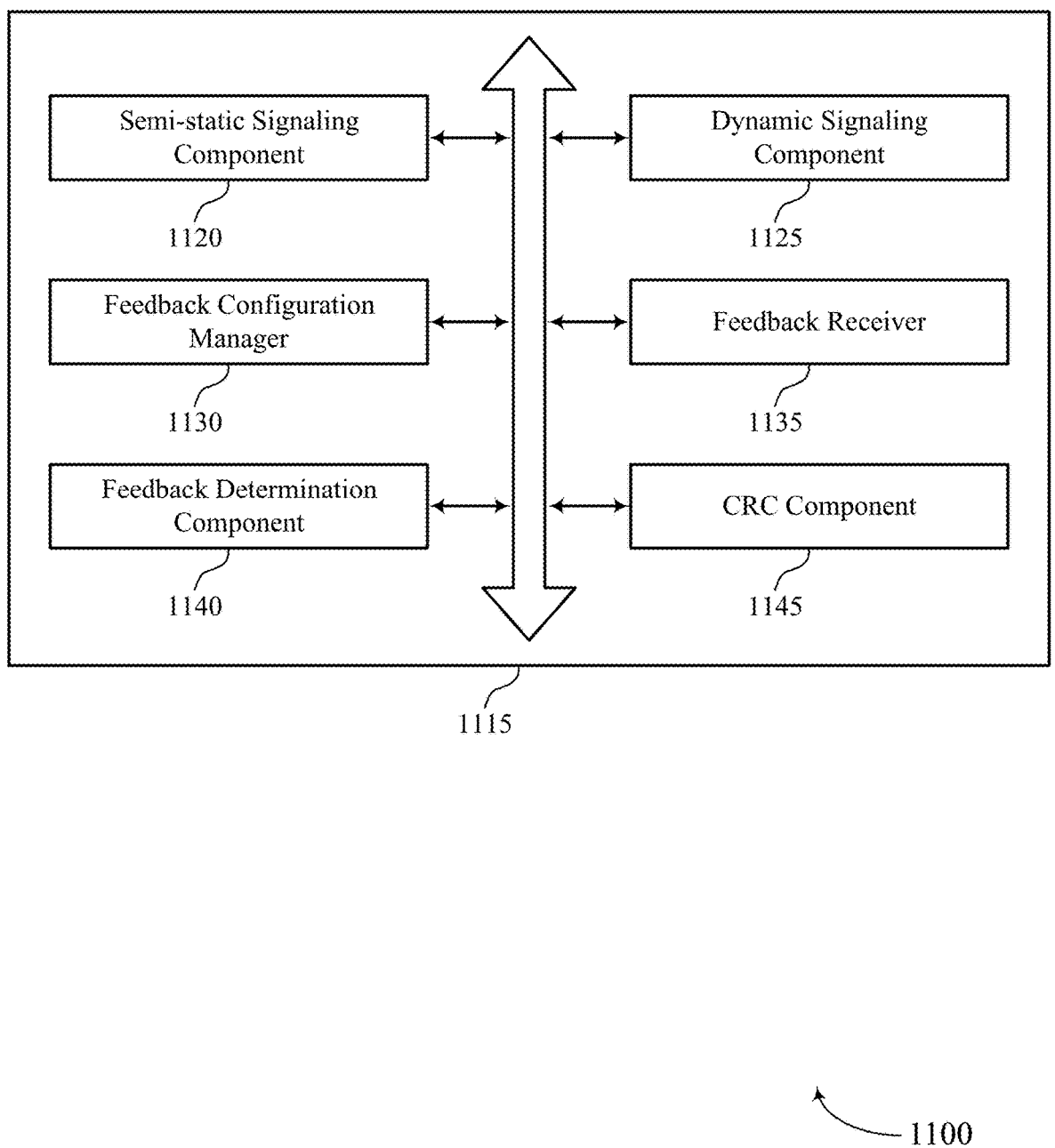

FIG. 11 shows a block diagram 1100 of a UE feedback manager 1115 that supports feedback techniques in wireless communications in accordance with aspects of the present disclosure. The UE feedback manager 1115 may be an example of aspects of a UE feedback manager 1215 described with reference to FIGS. 9, 10, and 12. The UE feedback manager 1115 may include semi-static signaling component 1120, dynamic signaling component 1125, feedback configuration manager 1130, feedback receiver 1135, feedback determination component 1140, and CRC component 1145. Each of these modules may communicate, directly or indirectly, with one another (e.g., via one or more buses).

Semi-static signaling component 1120 may receive semi-static signaling from a base station that indicates a feedback configuration to be applied across a set of transmissions, the feedback configuration for indicating successful reception of one or more downlink transmissions from the base station that include a set of types of information that have separate feedback processes. In some cases, the semi-static signaling is transmitted in RRC signaling to the UE and the dynamic signaling is provided in DCI transmitted to the UE for the first transmission. In some cases, the semi-static signaling indicates one or more of a number of configured component carriers, a number of identifiers that are to be monitored for transmissions, a number of configured feedback processes that are to be monitored, a number of separate transport blocks sent as separate codewords over one or more MIMO layers, a number of code block groups per transport block, threshold values for a number of bits of the feedback information to trigger bundling of feedback, one or more time delay values between transmit/receive events including one or more of receipt of control information associated with a first packet and receipt of the first packet or receipt of the first packet and transmission of the feedback information associated with the first packet, an explicit configuration for the interpretation of the feedback information, or any combination thereof.

Dynamic signaling component 1125 may receive dynamic signaling associated with at least a first transmission of the set of transmissions, the dynamic signaling indicating configuration is to be applied to the first uplink transmission and receive dynamic signaling associated with at least a first uplink transmission of the set of transmissions, the dynamic signaling indicating how the feedback configuration is to be applied to the first uplink transmission. In some cases, the dynamic signaling indicates one or more of a resource assignment for transmitting the feedback information, explicit dynamic signaling for the interpretation of the number of bits, dynamic triggering of control information to be multiplexed with the feedback information, or any combination thereof.

Feedback configuration manager 1130 may determine one or more of a number of bits or an interpretation of each bit of feedback information for providing feedback for the first transmission based on the semi-static signaling and the dynamic signaling associated with the first transmission. In some cases, the set of types of information include one or more of PDSCH for multiple component carriers, multiple transport blocks over multiple MIMO layers that may each have multiple code-block groups each with separate feedback processes, multiple independent PDSCH transmissions that may have separate RNTIs for scrambling the corresponding PDCCH DCI grant, one or more PDCCH orders with separate feedback processes such as an order indicating a beam change or a downlink SPS release, or combinations thereof. In some cases, the feedback information includes a set of ACK/NACK feedback bits and each bit of the set of ACK/NACK feedback bits provides ACK/NACK feedback for one or more packets, code blocks, or control messages of the first transmission. In some cases, the determining is based on a feedback configuration provided in the semi-static signaling which indicates a number of feedback bits and an interpretation of each feedback bit based on one or more of the set of types of information and an indication of which of the set of types of information are included with the first transmission. In some cases, the feedback information includes a set of ACK/NACK feedback bits and the dynamic signaling indicates that a subset of the set of ACK/NACK feedback bits are to be used for ACK/NACK feedback for control information associated with the first transmission. In some cases, the feedback information includes a set of ACK/NACK feedback bits and a subset of the set of ACK/NACK feedback bits provide bundled feedback for two or more sets of packets of the first transmission.

Feedback receiver 1135 may receive feedback information from the base station associated with the first uplink transmission and determine whether one or more portions of the uplink transmission were successfully received at the base station based on the determined number of bits or interpretation of each bit.

Feedback determination component 1140 may determine the feedback information for the first transmission based on the determined number of bits or the interpretation of each bit and transmit the feedback information to the base station. CRC component 1145 may compute a CRC for the feedback information.

Figure 12:
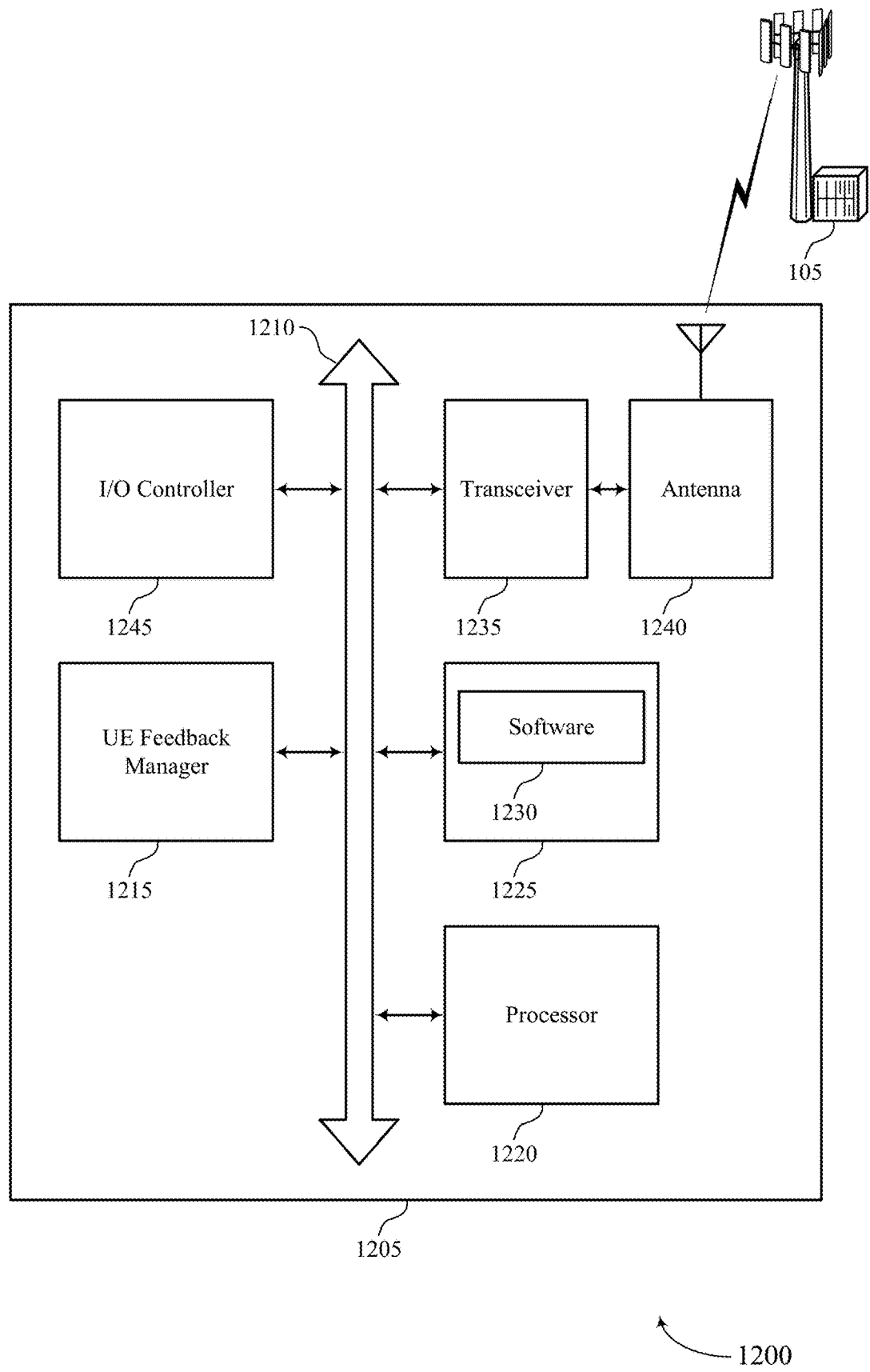
FIG. 12 illustrates a block diagram of a system including a UE that supports feedback techniques in wireless communications in accordance with aspects of the present disclosure.

FIG. 12 shows a diagram of a system 1200 including a device 1205 that supports feedback techniques in wireless communications in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE feedback manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting feedback techniques in wireless communications).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support feedback techniques in wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
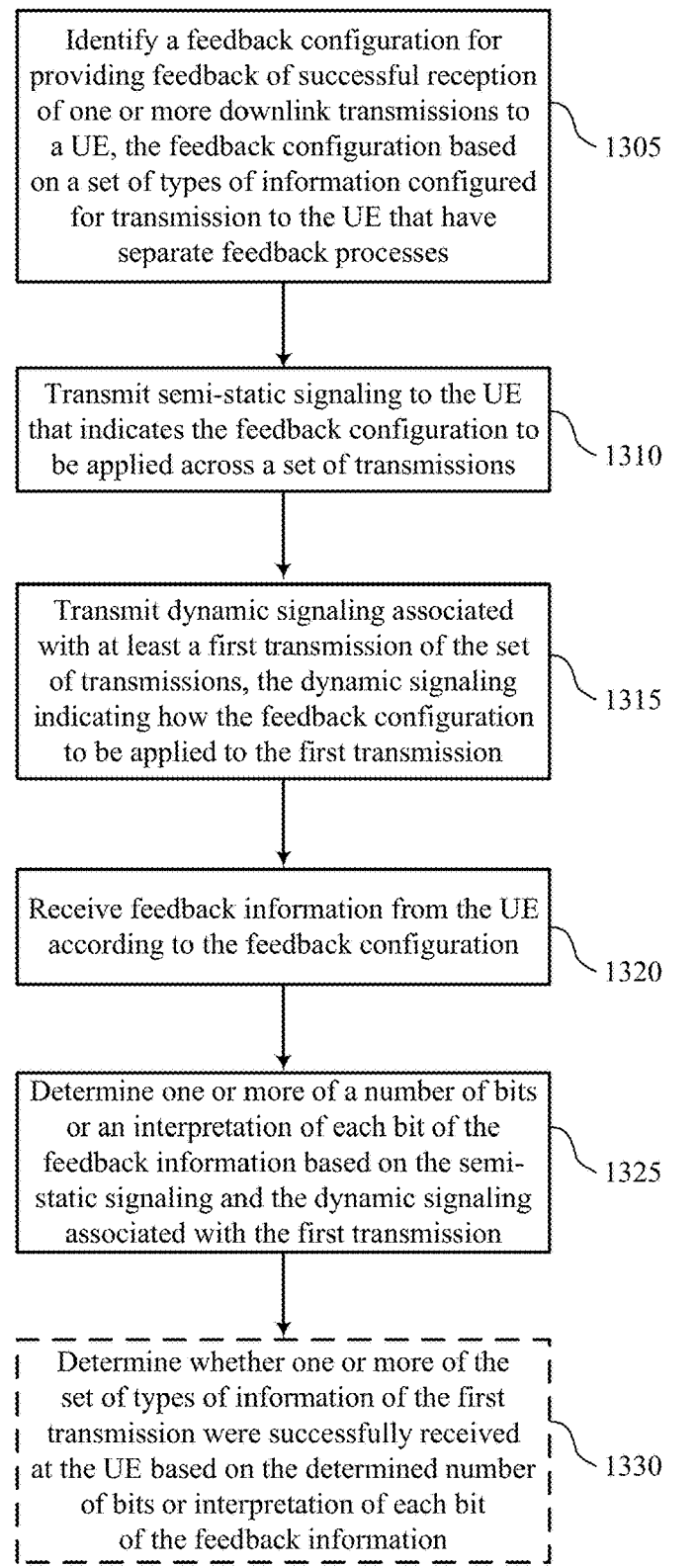
FIGS. 13 through 16 illustrate methods for feedback techniques in wireless communications in accordance with aspects of the present disclosure.

FIG. 13 shows a flowchart illustrating a method 1300 for feedback techniques in wireless communications in accordance with aspects of the present disclosure. The operations of method 1300 may be implemented by a base station 105 or its components as described herein. For example, the operations of method 1300 may be performed by a base station feedback manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify a feedback configuration for providing feedback of successful reception of one or more downlink transmissions to a UE, the feedback configuration based at least in part on a plurality of types of information configured for transmission to the UE that have separate feedback processes. The operations of block 1305 may be performed according to the methods described herein. In certain examples, aspects of the operations of block 1305 may be performed by a feedback configuration manager as described with reference to FIGS. 5 through 8.

At block 1310 the base station 105 may transmit semi-static signaling to the UE that indicates the feedback configuration to be applied across a plurality of transmissions. The operations of block 1310 may be performed according to the methods described herein. In certain examples, aspects of the operations of block 1310 may be performed by a semi-static signaling component as described with reference to FIGS. 5 through 8.

At block 1315 the base station 105 may transmit dynamic signaling associated with at least a first transmission of the plurality of transmissions, the dynamic signaling indicating configuration is to be applied to the first transmission. The operations of block 1315 may be performed according to the methods described herein. In certain examples, aspects of the operations of block 1315 may be performed by a dynamic signaling component as described with reference to FIGS. 5 through 8.

At block 1320 the base station 105 may receive feedback information from the UE according to the feedback configuration. The operations of block 1320 may be performed according to the methods described herein. In certain examples, aspects of the operations of block 1320 may be performed by a feedback receiver as described with reference to FIGS. 5 through 8.

At block 1325 the base station 105 may determine one or more of a number of bits or an interpretation of each bit of the feedback information based at least in part on the semi-static signaling and the dynamic signaling associated with the first transmission. The operations of block 1325 may be performed according to the methods described herein. In certain examples, aspects of the operations of block 1325 may be performed by a feedback configuration manager as described with reference to FIGS. 5 through 8.

At optional block 1330 the base station 105 may determine whether one or more of the plurality of types of information of the first transmission were successfully received at the UE based at least in part on the determined number of bits or interpretation of each bit of the feedback information. The operations of block 1330 may be performed according to the methods described herein. In certain examples, aspects of the operations of block 1330 may be performed by a feedback determination component as described with reference to FIGS. 5 through 8.

Figure 14:
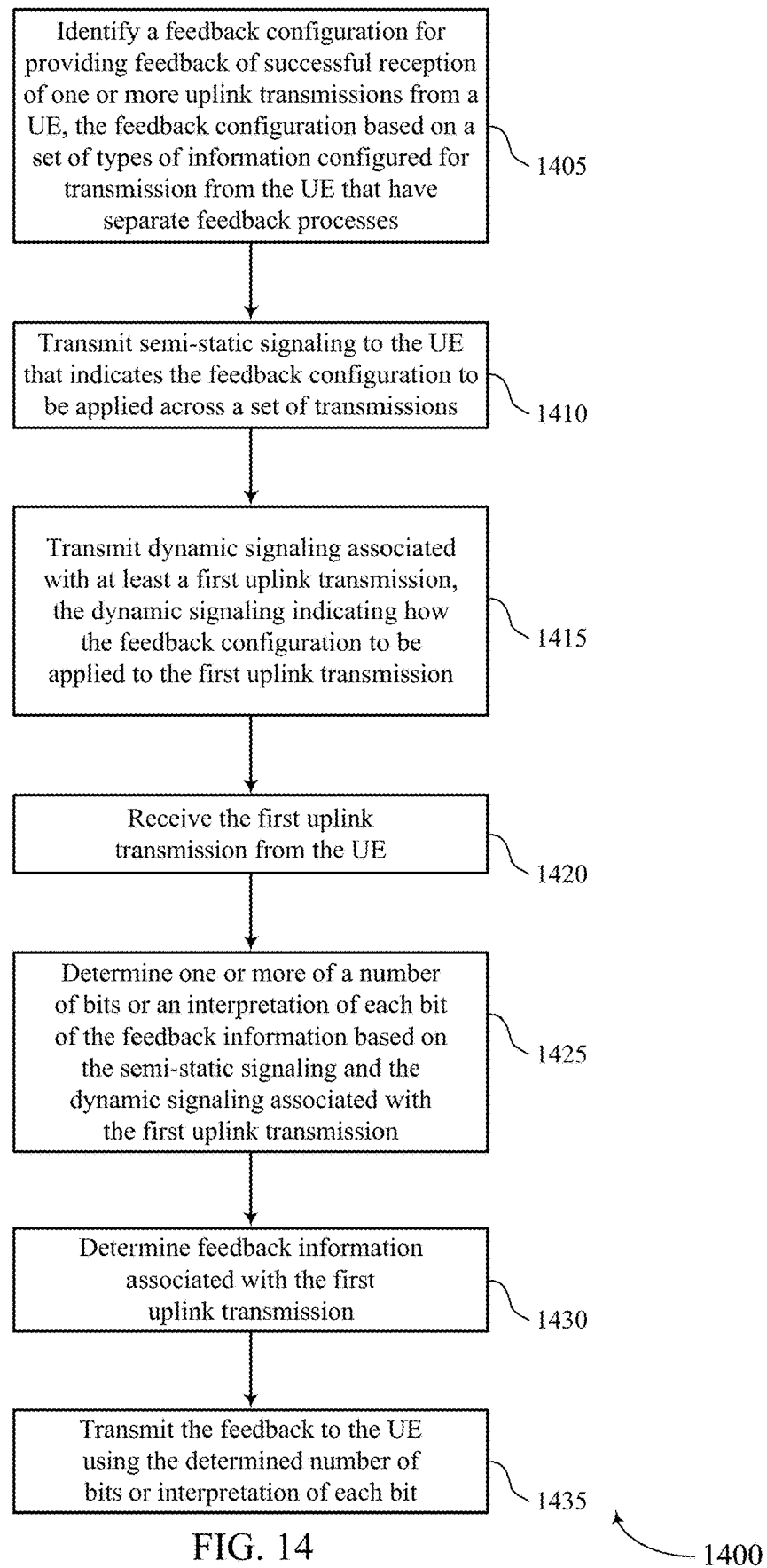

FIG. 14 shows a flowchart illustrating a method 1400 for feedback techniques in wireless communications in accordance with aspects of the present disclosure. The operations of method 1400 may be implemented by a base station 105 or its components as described herein. For example, the operations of method 1400 may be performed by a base station feedback manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify a feedback configuration for providing feedback of successful reception of one or more uplink transmissions from a UE, the feedback configuration based at least in part on a plurality of types of information configured for transmission from the UE that have separate feedback processes. The operations of block 1405 may be performed according to the methods described herein. In certain examples, aspects of the operations of block 1405 may be performed by a feedback configuration manager as described with reference to FIGS. 5 through 8.

At block 1410 the base station 105 may transmit semi-static signaling to the UE that indicates the feedback configuration to be applied across a plurality of transmissions. The operations of block 1410 may be performed according to the methods described herein. In certain examples, aspects of the operations of block 1410 may be performed by a semi-static signaling component as described with reference to FIGS. 5 through 8.

At block 1415 the base station 105 may transmit dynamic signaling associated with at least a first uplink transmission, the dynamic signaling indicating configuration is to be applied to the first uplink transmission. The operations of block 1415 may be performed according to the methods described herein. In certain examples, aspects of the operations of block 1415 may be performed by a dynamic signaling component as described with reference to FIGS. 5 through 8.

At block 1420 the base station 105 may receive the first uplink transmission from the UE. The operations of block 1420 may be performed according to the methods described herein. In certain examples, aspects of the operations of block 1420 may be performed by a feedback receiver as described with reference to FIGS. 5 through 8.

At block 1425 the base station 105 may determine one or more of a number of bits or an interpretation of each bit of the feedback information based at least in part on the semi-static signaling and the dynamic signaling associated with the first uplink transmission. The operations of block 1425 may be performed according to the methods described herein. In certain examples, aspects of the operations of block 1425 may be performed by a feedback configuration manager as described with reference to FIGS. 5 through 8.

At block 1430 the base station 105 may determine feedback information associated with the first uplink transmission. The operations of block 1430 may be performed according to the methods described herein. In certain examples, aspects of the operations of block 1430 may be performed by a feedback receiver as described with reference to FIGS. 5 through 8.

At block 1435 the base station 105 may transmit the feedback to the UE using the determined number of bits or interpretation of each bit. The operations of block 1435 may be performed according to the methods described herein. In certain examples, aspects of the operations of block 1435 may be performed by a feedback configuration manager as described with reference to FIGS. 5 through 8.

Figure 15:
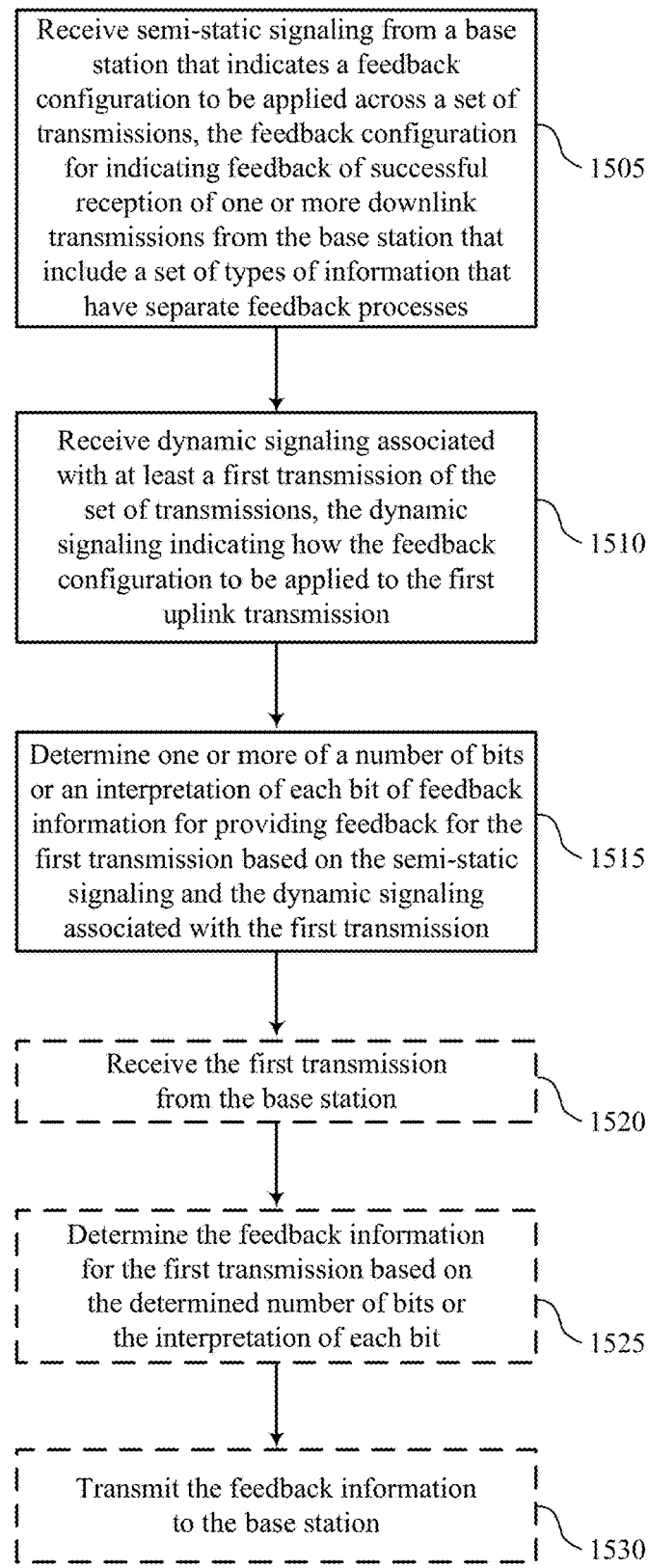

FIG. 15 shows a flowchart illustrating a method 1500 for feedback techniques in wireless communications in accordance with aspects of the present disclosure. The operations of method 1500 may be implemented by a UE 115 or its components as described herein. For example, the operations of method 1500 may be performed by a UE feedback manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive semi-static signaling from a base station that indicates a feedback configuration to be applied across a plurality of transmissions, the feedback configuration for indicating feedback of successful reception of one or more downlink transmissions from the base station that include a plurality of types of information that have separate feedback processes. The operations of block 1505 may be performed according to the methods described herein. In certain examples, aspects of the operations of block 1505 may be performed by a semi-static signaling component as described with reference to FIGS. 9 through 12.

At block 1510 the UE 115 may receive dynamic signaling associated with at least a first transmission of the plurality of transmissions, the dynamic signaling indicating configuration is to be applied to the first uplink transmission. The operations of block 1510 may be performed according to the methods described herein. In certain examples, aspects of the operations of block 1510 may be performed by a dynamic signaling component as described with reference to FIGS. 9 through 12.

At block 1515 the UE 115 may determine one or more of a number of bits or an interpretation of each bit of feedback information for providing feedback for the first transmission based at least in part on the semi-static signaling and the dynamic signaling associated with the first transmission. The operations of block 1515 may be performed according to the methods described herein. In certain examples, aspects of the operations of block 1515 may be performed by a feedback configuration manager as described with reference to FIGS. 9 through 12.

At optional block 1520 the UE 115 may receive the first transmission from the base station. The operations of block 1520 may be performed according to the methods described herein. In certain examples, aspects of the operations of block 1520 may be performed by a receiver as described with reference to FIGS. 9 through 12.

At optional block 1525 the UE 115 may determine the feedback information for the first transmission based at least in part on the determined number of bits or the interpretation of each bit. The operations of block 1525 may be performed according to the methods described herein. In certain examples, aspects of the operations of block 1525 may be performed by a feedback determination component as described with reference to FIGS. 9 through 12.

At optional block 1530 the UE 115 may transmit the feedback information to the base station. The operations of block 1530 may be performed according to the methods described herein. In certain examples, aspects of the operations of block 1530 may be performed by a feedback determination component as described with reference to FIGS. 9 through 12.

Figure 16:
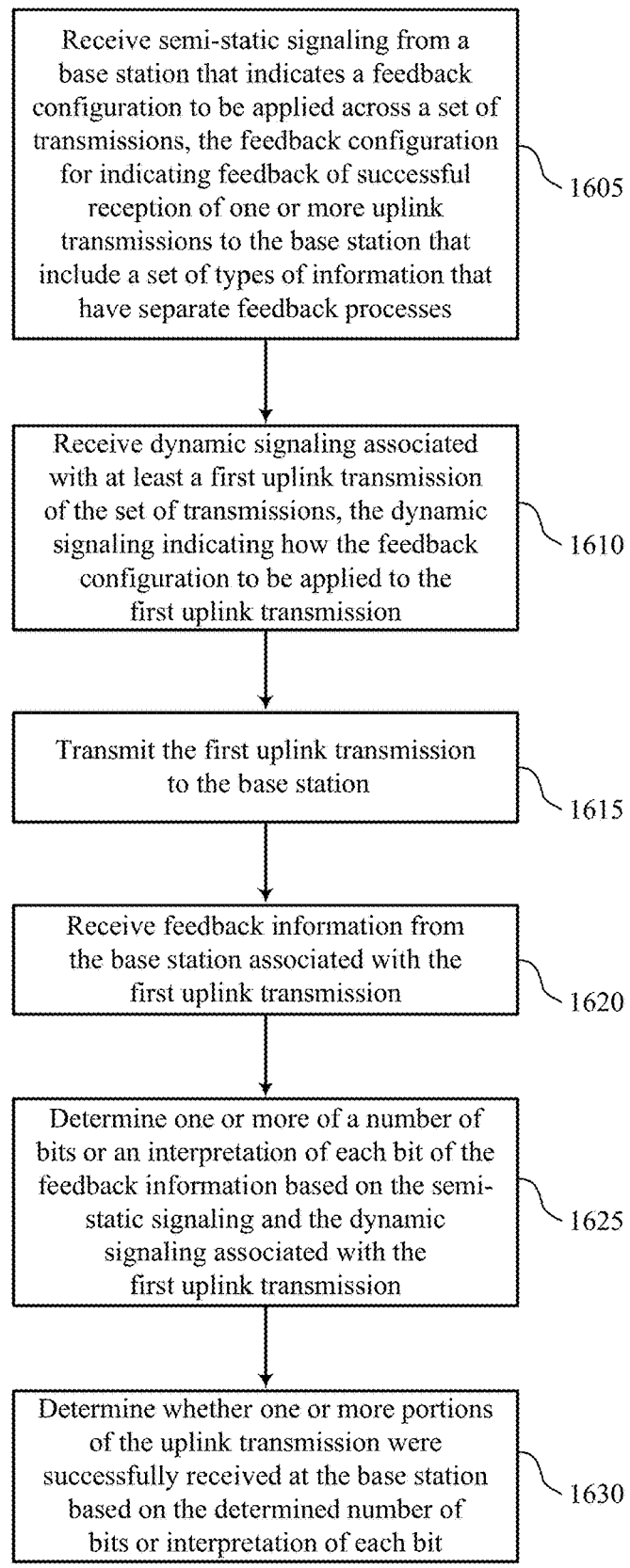

FIG. 16 shows a flowchart illustrating a method 1600 for feedback techniques in wireless communications in accordance with aspects of the present disclosure. The operations of method 1600 may be implemented by a UE 115 or its components as described herein. For example, the operations of method 1600 may be performed by a UE feedback manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive semi-static signaling from a base station that indicates a feedback configuration to be applied across a plurality of transmissions, the feedback configuration for indicating feedback of successful reception of one or more uplink transmissions to the base station that include a plurality of types of information that have separate feedback processes. The operations of block 1605 may be performed according to the methods described herein. In certain examples, aspects of the operations of block 1605 may be performed by a semi-static signaling component as described with reference to FIGS. 9 through 12.

At block 1610 the UE 115 may receive dynamic signaling associated with at least a first uplink transmission of the plurality of transmissions, the dynamic signaling indicating configuration is to be applied to the first uplink transmission. The operations of block 1610 may be performed according to the methods described herein. In certain examples, aspects of the operations of block 1610 may be performed by a dynamic signaling component as described with reference to FIGS. 9 through 12.

At block 1615 the UE 115 may transmit the first uplink transmission to the base station. The operations of block 1615 may be performed according to the methods described herein. In certain examples, aspects of the operations of block 1615 may be performed by a transmitter as described with reference to FIGS. 9 through 12.

At block 1620 the UE 115 may receive feedback information from the base station associated with the first uplink transmission. The operations of block 1620 may be performed according to the methods described herein. In certain examples, aspects of the operations of block 1620 may be performed by a feedback receiver as described with reference to FIGS. 9 through 12.

At block 1625 the UE 115 may determine one or more of a number of bits or an interpretation of each bit of the feedback information based at least in part on the semi-static signaling and the dynamic signaling associated with the first uplink transmission. The operations of block 1625 may be performed according to the methods described herein. In certain examples, aspects of the operations of block 1625 may be performed by a feedback configuration manager as described with reference to FIGS. 9 through 12.

At block 1630 the UE 115 may determine whether one or more portions of the uplink transmission were successfully received at the base station based at least in part on the determined number of bits or interpretation of each bit. The operations of block 1630 may be performed according to the methods described herein. In certain examples, aspects of the operations of block 1630 may be performed by a feedback receiver as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1S, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, an eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a feedback configuration for providing feedback of successful reception of one or more downlink transmissions to a user equipment (UE), the feedback configuration based at least in part on a plurality of types of information configured for transmission to the UE that have separate feedback processes;
transmitting first signaling to the UE that indicates the feedback configuration to be applied across a plurality of transmissions; and
transmitting second signaling associated with at least a first transmission of the plurality of transmissions, the second signaling indicating how the feedback configuration is to be applied to the first transmission.

2. The method of claim 1, further comprising:
receiving feedback information from the UE according to the feedback configuration.

3. The method of claim 2, wherein the feedback information includes a cyclic redundancy check (CRC).

4. The method of claim 2, further comprising:
determining one or more of a number of bits or an interpretation of each bit of the feedback information based at least in part on the first signaling and the second signaling associated with the first transmission.

5. The method of claim 4, further comprising:
determining whether one or more of the plurality of types of information of the first transmission were successfully received at the UE based at least in part on the determined number of bits or the interpretation of each bit of the feedback information.

6. The method of claim 4, wherein the determining comprises determining that a first number of bits are to be included in the feedback information based on the second signaling, and wherein the method further comprises:
receiving a second number of bits of feedback from the UE; and
determining that the UE unsuccessfully received the second signaling based at least in part on the receiving the second number of bits.

7. The method of claim 4, wherein each bit of the feedback information provides acknowledgment/negative-acknowledgment (ACK/NACK) feedback for one or more packets, code blocks, or control messages of the first transmission.

8. The method of claim 4, wherein the second signaling indicates that a subset of a set of ACK/NACK feedback bits are to be used for ACK/NACK feedback for control information associated with the first transmission.

9. The method of claim 4, wherein the feedback information comprises a set of ACK/NACK feedback bits and a subset of the set of ACK/NACK feedback bits provide bundled feedback for two or more sets of packets of the first transmission.

10. The method of claim 1, wherein the first signaling to the UE indicates one or more of:
a number of configured component carriers for the UE;
a number of identifiers associated with the UE that are to be monitored for transmissions to the UE;
a number of configured feedback processes that the UE is to monitor;
a number of separate transport blocks sent as separate codewords over one or more multiple-input multiple-output (MIMO) layers;
a number of code block groups per transport block;
threshold values for a number of bits of a set of feedback bits to trigger bundling of feedback;
one or more time delay values between transmit/receive events including one or more of receipt of control information associated with a first packet and receipt of the first packet or receipt of the first packet and transmission of the feedback information associated with the first packet;
an explicit configuration for an interpretation of the set of feedback bits;
or any combination thereof.

11. The method of claim 1, wherein the second signaling indicates one or more of:
a resource assignment for transmitting the feedback information;
explicit dynamic signaling for an interpretation of a set of feedback bits;
dynamic triggering of control information to be multiplexed with the feedback information;
or any combination thereof.

12. The method of claim 1, further comprising:
transmitting control information that indicates a change in a transmission beam or a transmission bandwidth for a second transmission.

13. The method of claim 1, wherein the first signaling comprises semi-static signaling and the second signaling comprises dynamic signaling.

14. A method for wireless communication, comprising:
receiving first signaling from a base station that indicates a feedback configuration to be applied across a plurality of transmissions, the feedback configuration for indicating feedback of successful reception of one or more downlink transmissions from the base station that include a plurality of types of information that have separate feedback processes; and
receiving second signaling associated with at least a first transmission of the plurality of transmissions, the second signaling indicating how the feedback configuration is to be applied to the first transmission.

15. The method of claim 14, further comprising:
determining one or more of a number of bits or an interpretation of each bit of feedback information for providing feedback for the first transmission based at least in part on the first signaling and the second signaling associated with the first transmission.

16. The method of claim 15, further comprising:
receiving the first transmission from the base station;
determining the feedback information for the first transmission based at least in part on the determined number of bits or the interpretation of each bit; and
transmitting the feedback information to the base station.

17. The method of claim 15, wherein the feedback information comprises a set of acknowledgment/negative-acknowledgment (ACK/NACK) feedback bits and each bit of a set of ACK/NACK feedback bits provides ACK/NACK feedback for one or more packets, code blocks, or control messages of the first transmission.

18. The method of claim 15, wherein the feedback information includes a cyclic redundancy check (CRC).

19. The method of claim 15, wherein the feedback information comprises a set of acknowledgment/negative-acknowledgment (ACK/NACK) feedback bits and the second signaling indicates that a subset of a set of ACK/NACK feedback bits are to be used for ACK/NACK feedback for control information associated with the first transmission.

20. The method of claim 15, wherein the feedback information comprises a set of acknowledgment/negative-acknowledgment (ACK/NACK) feedback bits and a subset of a set of ACK/NACK feedback bits provide bundled feedback for two or more sets of packets of the first transmission.

21. The method of claim 14, wherein the first signaling indicates one or more of:
a number of configured component carriers;
a number of identifiers that are to be monitored for transmissions;
a number of configured feedback processes that are to be monitored;
a number of separate transport blocks sent as separate codewords over one or more multiple-input multiple-output (MIMO) layers;
a number of code block groups per transport block;
threshold values for a number of bits of the feedback information to trigger bundling of feedback;
one or more time delay values between transmit/receive events including one or more of receipt of control information associated with a first packet and receipt of the first packet or receipt of the first packet and transmission of the feedback information associated with the first packet;
an explicit configuration for an interpretation of the feedback information;
or any combination thereof.

22. The method of claim 14, wherein the second signaling indicates one or more of:
a resource assignment for transmitting the feedback information;
explicit dynamic signaling for an interpretation of a number of bits;
dynamic triggering of control information to be multiplexed with the feedback information;
or any combination thereof.

23. The method of claim 14, further comprising:
receiving control information that indicates a change in a transmission beam or a transmission bandwidth for a next transmission of the plurality of transmissions.

24. The method of claim 14, wherein the first signaling comprises semi-static signaling and the second signaling comprises dynamic signaling.

25. An apparatus for wireless communication, comprising:
a processor;
memory in electronic communication with the processor; and
instructions stored in the memory and operable, when executed by the processor, to cause the apparatus to:
identify a feedback configuration for providing feedback of successful reception of one or more downlink transmissions to a user equipment (UE), the feedback configuration based at least in part on a plurality of types of information configured for transmission to the UE that have separate feedback processes;
transmit first signaling to the UE that indicates the feedback configuration to be applied across a plurality of transmissions; and
transmit second signaling associated with at least a first transmission of the plurality of transmissions, the second signaling indicating how the feedback configuration is to be applied to the first transmission.

26. The apparatus of claim 25, wherein the instructions are further executable by the processor to:
receive feedback information from the UE according to the feedback configuration.

27. The apparatus of claim 25, wherein the instructions are further executable by the processor to:
determine whether one or more of the plurality of types of information of the first transmission were successfully received at the UE based at least in part on the determined number of bits or an interpretation of each bit of the feedback information.

28. An apparatus for wireless communication, comprising:
a processor;
memory in electronic communication with the processor; and
instructions stored in the memory and operable, when executed by the processor, to cause the apparatus to:
receive first signaling from a base station that indicates a feedback configuration to be applied across a plurality of transmissions, the feedback configuration for indicating feedback of successful reception of one or more downlink transmissions from the base station that include a plurality of types of information that have separate feedback processes; and
receive second signaling associated with at least a first transmission of the plurality of transmissions, the second signaling indicating how the feedback configuration is to be applied to the first transmission.

29. The apparatus of claim 28, wherein the instructions are further executable by the processor to:
determine one or more of a number of bits or an interpretation of each bit of feedback information for providing feedback for the first transmission based at least in part on the first signaling and the second signaling associated with the first transmission;
receive the first transmission from the base station;
determine the feedback information for the first transmission based at least in part on the determined number of bits or the interpretation of each bit; and
transmit the feedback information to the base station.

30. The apparatus of claim 28, wherein:
the first signaling comprises semi-static signaling and indicates one or more of:
a number of configured component carriers;
a number of identifiers that are to be monitored for transmissions;
a number of configured feedback processes that are to be monitored;
a number of separate transport blocks sent as separate codewords over one or more multiple-input multiple-output (MIMO) layers;
a number of code block groups per transport block;
threshold values for a number of bits of the feedback information to trigger bundling of feedback;
one or more time delay values between transmit/receive events including one or more of receipt of control information associated with a first packet and receipt of the first packet or receipt of the first packet and transmission of the feedback information associated with the first packet;
an explicit configuration for an interpretation of the feedback information;
or any combination thereof; and
the second signaling comprises dynamic signaling and indicates one or more of:

a resource assignment for transmitting the feedback information;
explicit dynamic signaling for the interpretation of the number of bits;
dynamic triggering of control information to be multiplexed with the feedback information;
or any combination thereof.

* * * * *